United States Patent
Park et al.

(10) Patent No.: US 12,386,194 B2
(45) Date of Patent: Aug. 12, 2025

(54) CAMERA MODULE

(71) Applicant: Samsung Electro-Mechanics Co., Ltd., Suwon-si (KR)

(72) Inventors: Jae Man Park, Suwon-si (KR); Bong Won Jeong, Suwon-si (KR); Young Bok Yoon, Suwon-si (KR); Jung Seok Lee, Suwon-si (KR); Soo Cheol Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 398 days.

(21) Appl. No.: 17/066,754

(22) Filed: Oct. 9, 2020

(65) Prior Publication Data

US 2021/0294113 A1     Sep. 23, 2021

(30) Foreign Application Priority Data

Mar. 19, 2020     (KR) .................. 10-2020-0034079

(51) Int. Cl.
| | |
|---|---|
| *G02B 27/64* | (2006.01) |
| *G02B 7/09* | (2021.01) |
| *G03B 5/00* | (2021.01) |
| *G03B 13/36* | (2021.01) |

(52) U.S. Cl.
CPC ............ *G02B 27/648* (2013.01); *G02B 7/09* (2013.01); *G03B 5/00* (2013.01); *G03B 13/36* (2013.01); *G03B 2205/0007* (2013.01)

(58) Field of Classification Search
CPC .. G03B 5/00; G03B 5/04; G03B 13/36; G03B 2205/0007; G03B 2205/0053; G03B 2205/0015; G03B 2205/0069; G03B 3/02; G03B 3/10; G03B 13/34; G03B 30/00; G02B 7/021; G02B 7/04; G02B 7/08; G02B 7/09; G02B 7/10; G02B 9/62; G02B 13/001; G02B 13/0065; G02B 27/646; H04N 5/2253; H04N 5/2254;
(Continued)

(56) References Cited

U.S. PATENT DOCUMENTS

| | | | |
|---|---|---|---|
| 2014/0340574 A1* | 11/2014 | Han .................. | H04N 23/57 |
| | | | 348/374 |
| 2017/0108705 A1* | 4/2017 | Yu ..................... | G02B 7/09 |
| 2018/0031854 A1* | 2/2018 | Hu .................... | G03B 3/10 |

(Continued)

FOREIGN PATENT DOCUMENTS

| | | |
|---|---|---|
| CN | 102279453 A | 12/2011 |
| CN | 109581683 A | 4/2019 |

(Continued)

OTHER PUBLICATIONS

English language machine translation of Han Kwang Joon, KR-20130124671-A, (Year: 2012).*

(Continued)

*Primary Examiner* — Marin Pichler
(74) *Attorney, Agent, or Firm* — NSIP Law

(57) ABSTRACT

A camera module includes: a housing; a lens module disposed in the housing; a driving assembly configured to move the lens module in a direction of an optical axis or a direction intersecting the optical axis; and a reinforcing structure formed integrally with the housing, and electrically connected to the driving assembly.

12 Claims, 19 Drawing Sheets

(58) Field of Classification Search
CPC .. H04N 5/2257; H04N 5/23287; H02K 11/33; H02K 41/0356
USPC ....... 359/911, 554, 555, 557, 811, 813, 814, 359/824, 872, 877
See application file for complete search history.

(56) References Cited

U.S. PATENT DOCUMENTS

| | | | |
|---|---|---|---|
| 2018/0356609 A1* | 12/2018 | Kim | ............ G03B 5/04 |
| 2019/0101771 A1 | 4/2019 | Takimoto | |
| 2019/0294026 A1 | 9/2019 | Sugawara | |
| 2021/0006720 A1 | 1/2021 | Enta | |

FOREIGN PATENT DOCUMENTS

| | | | |
|---|---|---|---|
| JP | 2011-164632 A | | 8/2011 |
| JP | 2018-18022 A | | 2/2018 |
| JP | 2019-518234 A | | 6/2019 |
| KR | 20130124671 A | * | 5/2012 |
| KR | 10-2013-0101473 A | | 9/2013 |
| KR | 10-1751132 B1 | | 6/2017 |
| KR | 10-2018-0056120 A | | 5/2018 |
| KR | 10-2019-0106145 A | | 9/2019 |
| KR | 10-2019-0123082 A | | 10/2019 |
| WO | WO 2014/092212 A1 | | 6/2014 |

OTHER PUBLICATIONS

Korean Office Action issued on May 12, 2021 in counterpart Korean Patent Application No. 10-2020-0034079. (8 pages in English)(6 pages in Korean).

Korean Office Action issued on Nov. 29, 2021 in corresponding Korean Patent Application No. 10-2020-0034079. (10 pages and 7 pages in Korean).

Chinese Office Action issued on May 5, 2022 in corresponding Chinese Patent Application No. 202011551960.9 (7 pages in English and 6 pages in Chinese).

* cited by examiner

IV-IV

CAMERA MODULE

CROSS-REFERENCE TO RELATED APPLICATIONS

This application claims the benefit under 35 U.S.C. § 119 (a) of Korean Patent Application No. 10-2020-0034079 filed on Mar. 19, 2020 in the Korean Intellectual Property Office, the entire disclosure of which is incorporated herein by reference for all purposes.

BACKGROUND

The following description relates to a camera module having a housing structure in which a driving coil is disposed.

A camera module may include a driving assembly for driving a lens module. The driving assembly may include a plurality of lens modules configured to be driven in an optical axis direction and a direction intersecting the optical axis. For example, the driving assembly may be disposed on three surfaces of a housing in which the lens module is disposed. The camera module may include a substrate for transmitting a current and a current signal to the driving assembly. The substrate may be disposed on a perimeter of the housing so as to transmit the current and the current signal to the driving assembly. The housing is configured to have predetermined rigidity to support the lens module or driving assembly. For example, the perimeter of the housing is formed with a predetermined thickness to provide a suitable rigidity. Therefore, it may be difficult to reduce a size of the camera module configured as described above due to the thickness of the housing and the substrate surrounding the perimeter of the housing.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, camera module includes: a housing; a lens module disposed in the housing; a driving assembly configured to move the lens module in a direction of an optical axis or a direction intersecting the optical axis; and a reinforcing structure formed integrally with the housing, and electrically connected to the driving assembly.

The driving assembly may include: a driving magnet disposed in the lens module; and a driving coil disposed in the housing and electrically connected to the reinforcing structure.

The camera module may further include: a detection sensor electrically connected to the reinforcing structure and configured to detect displacement of the lens module in the direction of the optical axis or the direction intersecting the optical axis.

The reinforcing structure may include a first reinforcing member and a second reinforcing member. A first end of the first reinforcing member and a first end of the second reinforcing member may be connected to the driving coil. A second end of the first reinforcing member and a second end of the second reinforcing member may be respectively connected to the connection terminals.

The first reinforcing member and the second reinforcing member may each have an inverted U shape or a spiral shape.

The camera module may further include a connection terminal formed in the housing, and electrically connected to the driving assembly by the reinforcing structure.

The reinforcing structure may be formed on a sidewall of the housing.

The camera module may further include a circuit board on which an image sensor configured to convert an optical signal incident through the lens module into an electrical signal is disposed.

The camera module may further include a detection sensor disposed on the circuit board, and configured to detect displacement of the lens module in the direction of the optical axis or the direction intersecting the optical axis.

The reinforcing structure may be formed on a flange portion of the housing.

The driving assembly may include: a driving magnet disposed in the lens module; and a driving coil disposed on the reinforcing structure.

The reinforcing structure may have a spiral shape.

The reinforcing structure may include a reinforcing member having an inverted U shape, In another general aspect, a camera module includes: a driving assembly configured to move a lens module in a direction of an optical axis or a direction intersecting the optical axis; a housing in which the lens module is received; a first reinforcing member formed integrally with a sidewall of the housing, and increasing rigidity of the housing; and a second reinforcing member formed integrally with a flange portion of the housing. A driving coil of the driving assembly is disposed on the second reinforcing member.

The camera module may further include: a detection sensor disposed on the first reinforcing member, electrically connected to the first reinforcing member, and configured to detect displacement of the lens module in the direction of the optical axis direction or the direction intersecting the optical axis.

The detection sensor may be disposed on a circuit board on which an image sensor is mounted.

The camera module may further include: a connection terminal formed on the first reinforcing member or the second reinforcing member, and configured to electrically connect the driving coil to an external circuit.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
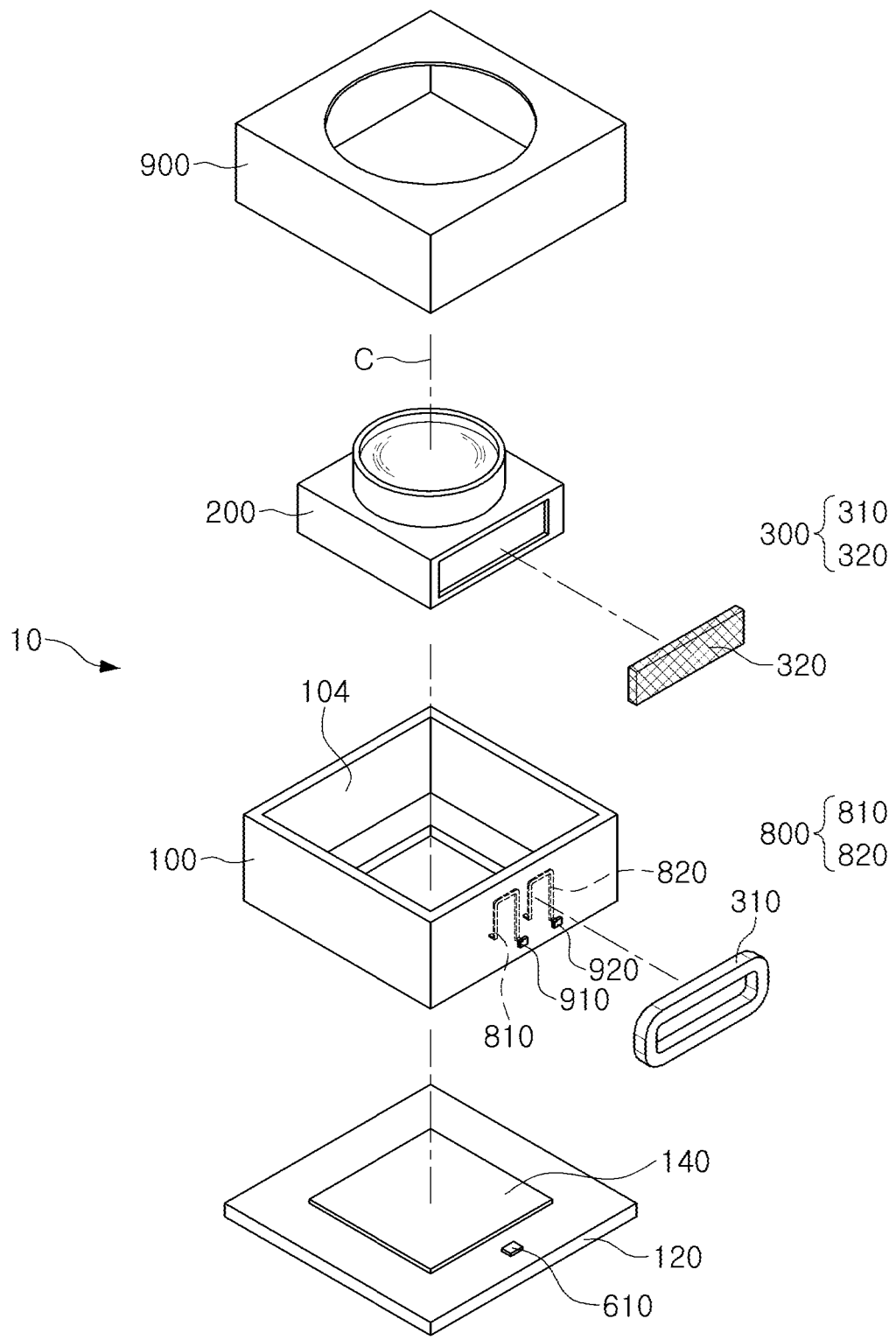
FIG. 1 is an exploded perspective view of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A camera module according to the disclosure herein may be mounted in a portable electronic product. For example, the camera module may be mounted on a mobile phone, laptop, or the like. However, a usage range of the disclosed camera module is not limited to the above-described electronic products. For example, the camera module may be installed in an automated teller machine (ATM), a television for interactive broadcasting, and the like.

FIG. 1 illustrates a camera module 10, according to an embodiment.

Referring to FIG. 1, the camera module 10 may include, for example, a housing 100, a circuit board 120, an image sensor 140, a lens module 200, a first driving assembly 300, and a reinforcing structure 800. However, a configuration of the camera module 10 is not limited to the aforementioned members. For example, the camera module 10 may further include a first detection sensor 610, a shield can 900, and connection terminals 910 and 920.

The housing 100 may be made of a plastic material. For example, the housing 100 may be manufactured by injection molding. The housing 100 is configured to receive the lens module 200. For example, a space sufficient to completely receive the lens module 200 may be formed inside the housing 100. The housing 100 may have a form in which an upper portion and a lower portion of the housing 100 are open, so that light incident along an optical axis C can be imaged on the image sensor 140, which is disposed below the housing 100. The housing 100 may be generally in a form of a face having a plurality of side surfaces. For example, the housing 100 may have a shape similar to a hexahedron having four sides, as shown in FIG. 1. However, the shape of the housing 100 is not limited to the shape shown in FIG. 1. For example, the housing 100 may have a cylindrical shape with a curved side surface.

The circuit board 120 may be disposed in the housing 100. For example, the circuit board 120 may be disposed below the housing 100. The circuit board 120 may be electrically connected to the image sensor 140. For example, the circuit board 120 may be formed with an electric circuit configured to transmit an electric signal from the image sensor 140 to an external or other electronic component. The circuit board 120 may be composed of a single-layer or multilayer substrate. For example, the circuit board 120 may be manufactured in a form in which an insulating layer and a plating layer on which an electric circuit is formed are sequentially stacked. An electronic component may be mounted on the circuit board 120. For example, one or more electronic components required for driving the camera module 10 may be disposed above or inside the circuit board 120.

The image sensor 400 is configured to convert an optical signal into an electrical signal. For example, the image sensor 400 may be manufactured in a CCD form. However, the image sensor 140 is not limited to the CCD form. For example, the image sensor 140 may be manufactured in a CMOS form. The image sensor 140 may be disposed on the circuit board 120. For example, the image sensor 140 may be mounted on an upper portion of the circuit board 120. The image sensor 140 may be electrically connected to the circuit board 120. For example, the image sensor 140 may be connected to an electrical circuit of the circuit board 120, and may be configured to transmit the converted electrical signal externally through the circuit board 120.

The lens module 200 may be configured to image light reflected from an object on the image sensor 400. For example, the lens module 200 may image light incident through one or more lenses on the image sensor 140. The lens module 200 may be driven inside the housing 100. For example, the lens module 200 may be moved along the optical axis C for focus adjustment.

The first driving assembly 300 is configured to drive the lens module 200. For example, the first driving assembly 300 may drive the lens module 200 in the direction of the optical axis C (hereinafter, "optical axis direction"). The first driving assembly 300 may include a first driving coil 310 and a first driving magnet 320. However, the configuration of the first driving assembly 300 is not limited to the above-described members.

Figure 7:
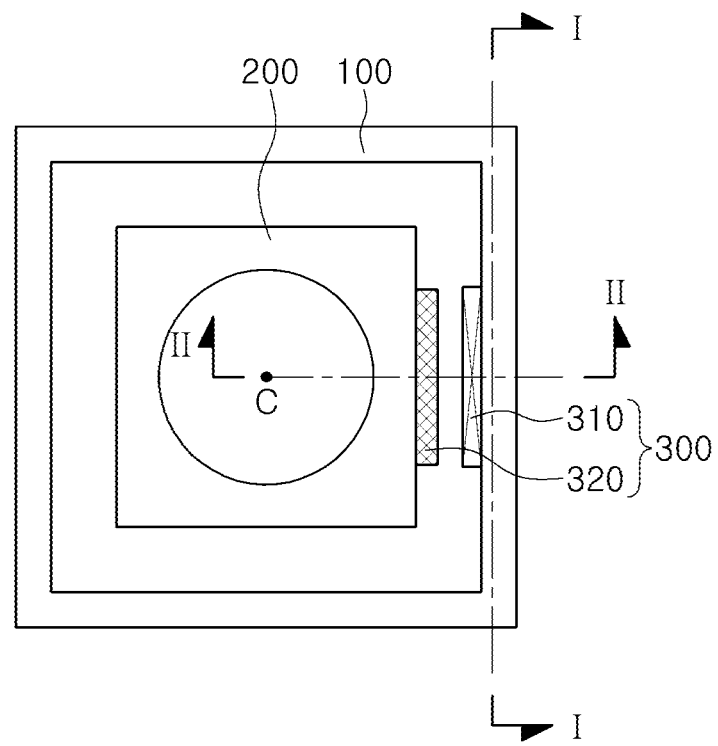
FIG. 7 is a plan view of the camera module shown in FIG. 1.

As shown in FIG. 7, the first driving coil 310 may be disposed in the housing 100. For example, the first driving coil 310 may be disposed on an inner side surface of the housing 100 to face one surface of the lens module 200.

Further, as shown in FIG. 7, the first driving magnet 320 may be disposed in the lens module 200. For example, the first driving magnet 320 may be disposed on one side of the lens module 200 so as to face the first driving coil 310. The first driving coil 310 and the first driving magnet 320 may provide driving force required for driving the lens module 200. For example, the magnetic force generated between the first driving coil 310 and the first driving magnet 320 may move the lens module 200 upwardly or downwardly (e.g., in the optical axis direction).

A reinforcing structure 800 is formed in the housing 100. For example, the reinforcing structure 800 may be formed on one sidewall 104 or two or more sidewalls 104 of the housing 100. The reinforcing structure 800 may be made of a material different from a material of the housing 100. For example, the reinforcing structure 800 may be made of a metal material. However, the material of the reinforcing structure 800 is not limited to metal. The reinforcing structure 800 may be configured to increase rigidity of the housing 100. For example, the reinforcing structure 800 may be integrally formed with the housing 100 by an insert injection method to improve the rigidity of the housing 100. The reinforcing structure 800 may be electrically connected to the first driving coil 310. For example, first ends 812 and 822 (FIG. 2) of the reinforcing structure 800 may be connected to the first driving coil 310, which is disposed inside the housing 100, to enable supply of current to the first driving coil 310. The reinforcing structure 800 may be electrically connected to connection terminals 910 and 920. For example, second ends 814 and 824 (FIG. 2) of the reinforcing structure 800 may be connected to the connection terminals 910 and 920 disposed outside the housing 100, to enable electrical connection to be formed between the first driving coil 310 and the connection terminals 910 and 920. For reference, although not illustrated in the accompanying drawings, the connection terminals 910 and 920 may be electrically connected to the circuit board 120 through a separate element or component.

The first detection sensor 610 is configured to detect the position of the lens module 200. For example, the first detection sensor 610 may be configured to transmit different electrical signals according to the position of the lens module 200 in the optical axis direction. The first detection sensor 610 may be directly or indirectly connected to the first driving assembly 300. For example, the first detection sensor 610 may transmit a reference value required for calculating a driving size of the first driving assembly 300 to a control unit, or controller, of the first driving assembly 300. The first detection sensor 610 is formed on the circuit board 120. However, a formation position of the first detection sensor 610 is not limited to the circuit board 120. For example, the first detection sensor 610 may also be disposed inside the housing 100.

Figure 2:
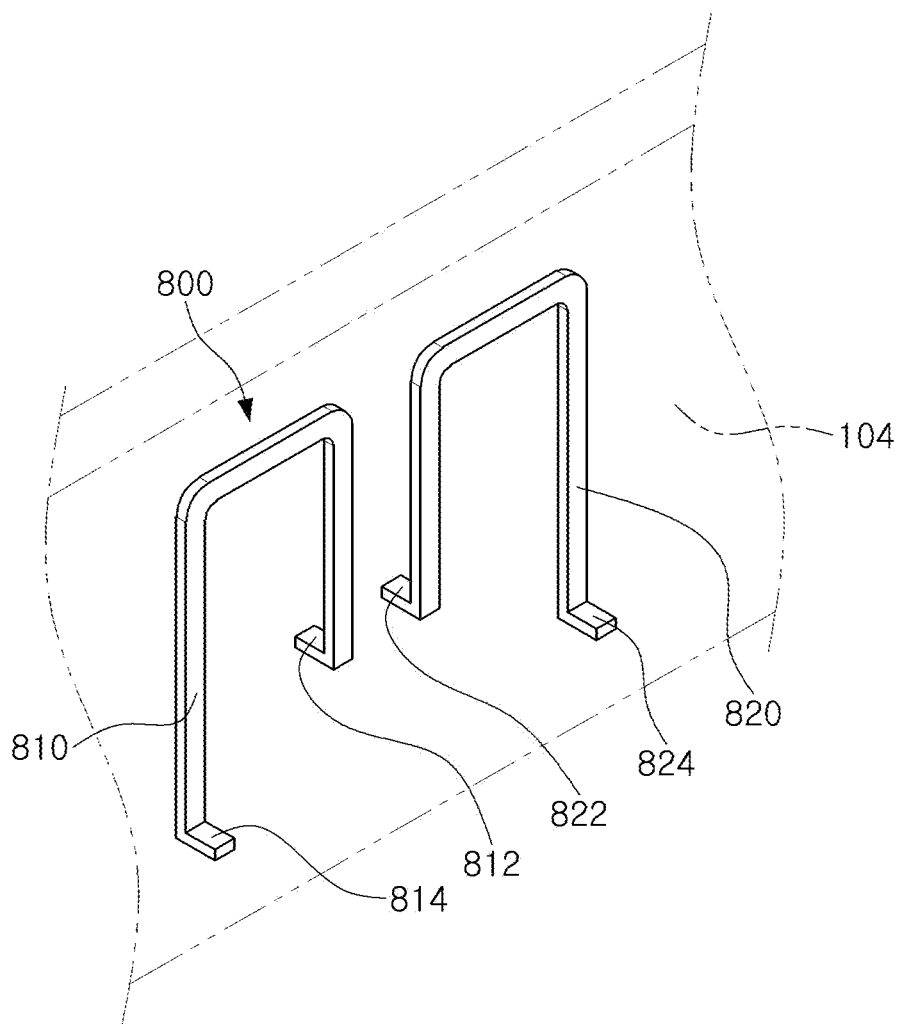
FIG. 2 is a perspective view of a reinforcing structure shown in FIG. 1.

Next, a more detailed description of the reinforcing structure 800 will be described with reference to FIG. 2.

A reinforcing structure 800 may be configured to contact an external member. For example, the first ends 812 and 822 of the reinforcing structure 800 may be formed to extend inside the housing 100 to be connected to the first coil member 310, and the second ends 814 and 824 of the reinforcing structure 800 may be formed to extend outside the housing 100 to be connected to connection terminals 910 and 920, respectively.

The reinforcing structure 800 may be configured to extend along a sidewall of the housing 100. For example, a portion of the reinforcing structure 800 may be formed to extend along a height direction of the sidewall of the housing 100, and a portion of the reinforcing structure 800 may be formed to extend along a width direction of the sidewall of the housing 100.

The reinforcing structure 800 may include multiple members. For example, the reinforcing structure 800 may be composed of a first reinforcing member 810 and a second reinforcing member 820. However, the reinforcing structure 800 is not necessarily composed of two members. For example, the reinforcing structure 800 may be composed of three or more separated members.

The first reinforcing member 810 and the second reinforcing member 820 may be configured in a symmetrical shape. However, the first reinforcing member 810 and the second reinforcing member 820 are not necessarily configured in a symmetrical shape. For example, the first reinforcing member 810 and the second reinforcing member 820 may be configured in the same form or may be configured in different forms.

For example, the first reinforcing member 810 and the second reinforcing member 820 may each have an approximate overall shape of an inverted U. The first reinforcing member 810 may include the first end 812 and the second end 814, which extend in opposite directions. The second reinforcing member 820 may include the first end 822 and the second end 824, which extend in opposite directions.

The reinforcing structure 800 configured as described above may be integrally formed with the housing 100 to increase the rigidity of the housing 100. Therefore, the camera module 10 may not need to unnecessarily increase the size of the housing 100 or increase the sidewall thickness of the housing 100 in order to reinforce rigidity of the housing 100.

The reinforcing member 800 may be modified in various forms.

Figure 3:
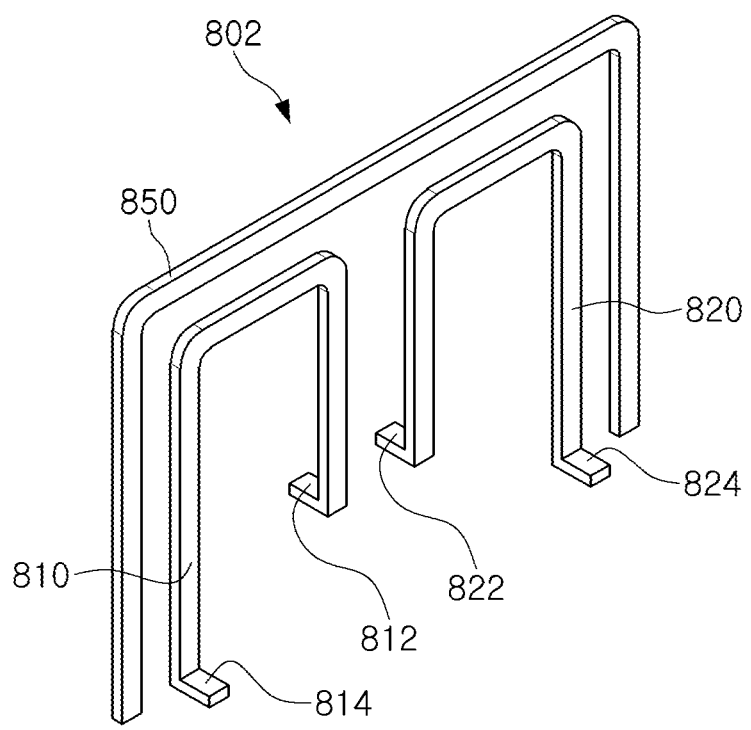
FIGS. 3 to 5 are perspective views of reinforcing structures, according to embodiments
Figure 4:
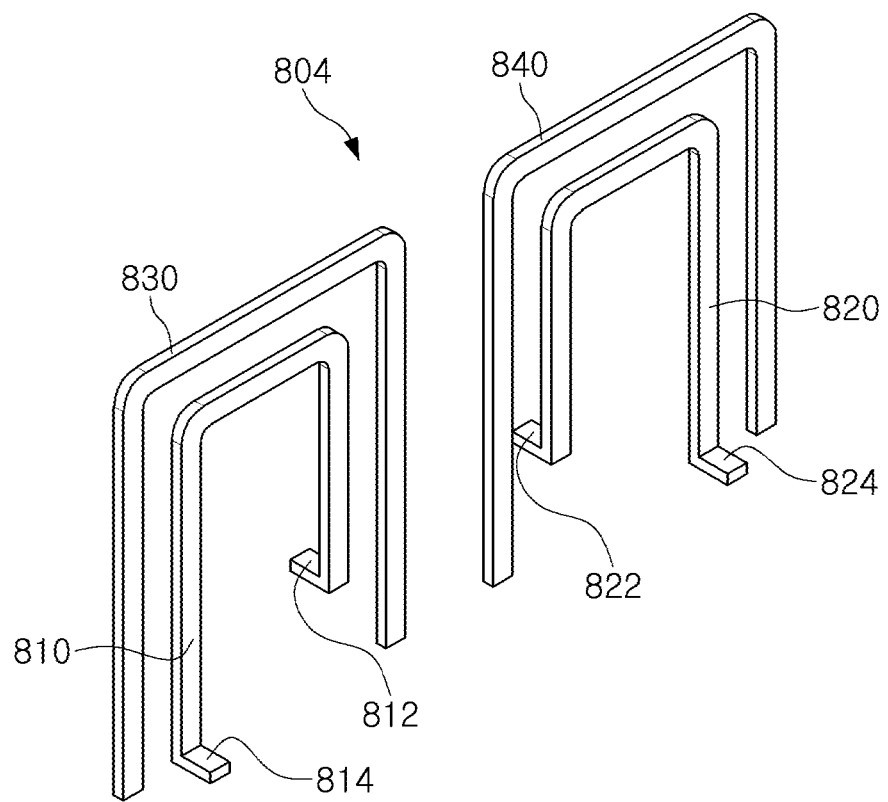
Figure 5:
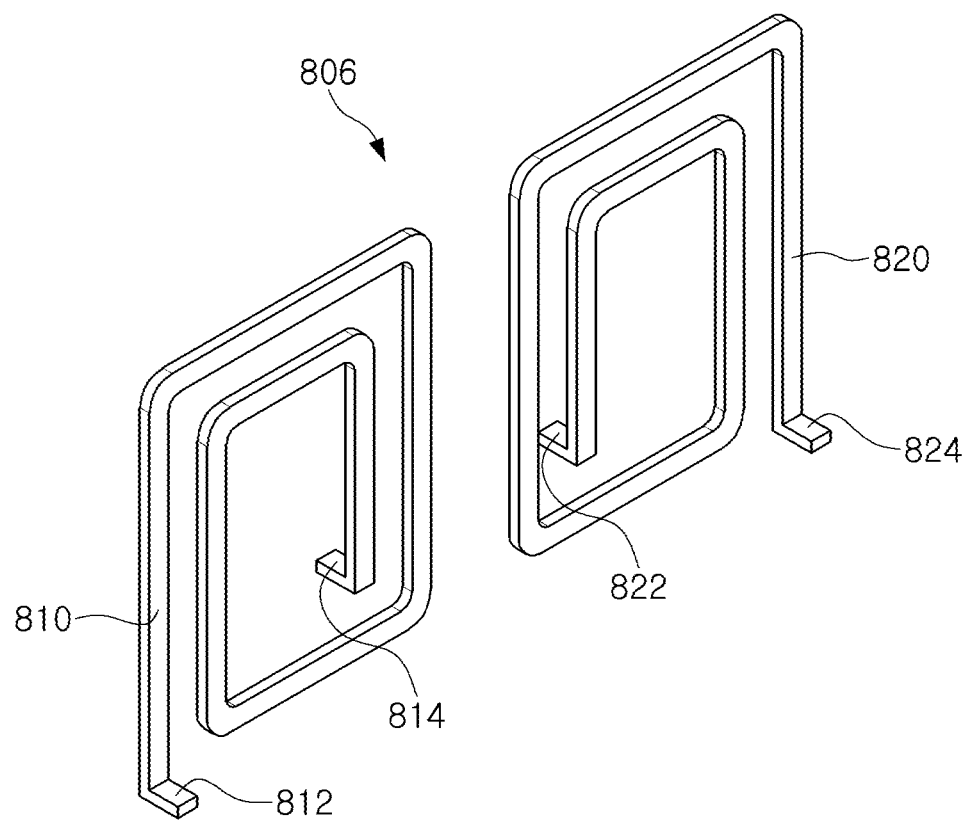

FIGS. 3 to 5 illustrate reinforcing structures 802, 804, and 806, respectively, according to embodiments.

Referring to FIG. 3, as an example, the reinforcing structure 802 may be composed of the first reinforcing member 810, the second reinforcing member 820, and a third reinforcing member 850. The first reinforcing member 810 and the second reinforcing member 820 may have the forms described above with respect to FIG. 2. However, the shapes of the first reinforcing member 810 and the second reinforcing member 820 are not limited to those shown in FIG. 2. The third reinforcing member 850 may be formed in a form surrounding the perimeter of the first reinforcing member 810 and the second reinforcing member 820. A distance between the third reinforcing member 850 and the first reinforcing member 810, and a distance between the third reinforcing member 850 and the second reinforcing member 820 may be substantially the same.

Referring to FIG. 4, as another example, the reinforcing structure 804 may be composed of the first reinforcing member 810, the second reinforcing member 820, a third reinforcing member 830, and a fourth reinforcing member 840. The first reinforcing member 810 and the second reinforcing member 820 may have the same forms described above with respect to FIG. 2. However, the shapes of the first reinforcing member 810 and the second reinforcing member 820 are not limited to those shown in FIG. 2. The third reinforcing member 830 and the fourth reinforcing member 840 may be formed in forms surrounding each of the perimeters of the first reinforcing member 810 and the second reinforcing member 820. For example, the third reinforcing member 830 may be formed in a form surrounding the perimeter of the first reinforcing member 810, and the fourth reinforcing member 840 may be formed in a form surrounding the perimeter of the second reinforcing member 820.

Referring to FIG. 5, as another example, the reinforcing structure 806 may be composed of a first reinforcing member 810' and a second reinforcing member 820' formed to have a spiral shape.

The reinforcing structures 802, 804, and 806 shown in FIGS. 3 to 5 may electrically connect the first driving coil 310 to the connection terminals 910 and 920 through the reinforcing members 810 and 820, and may improve the rigidity of the housing 100 through the respective reinforcing members 810, 820, 830, 840, and 850. For reference, a reinforcing structure may be provided in forms other than those shown in FIGS. 3 to 5. For example, a reinforcing structure may have a mixture of two or more of the shapes shown in FIGS. 3 to 5.

A coupling form of the camera module 10 will be described with reference to FIGS. 6 to 9.

Figure 6:
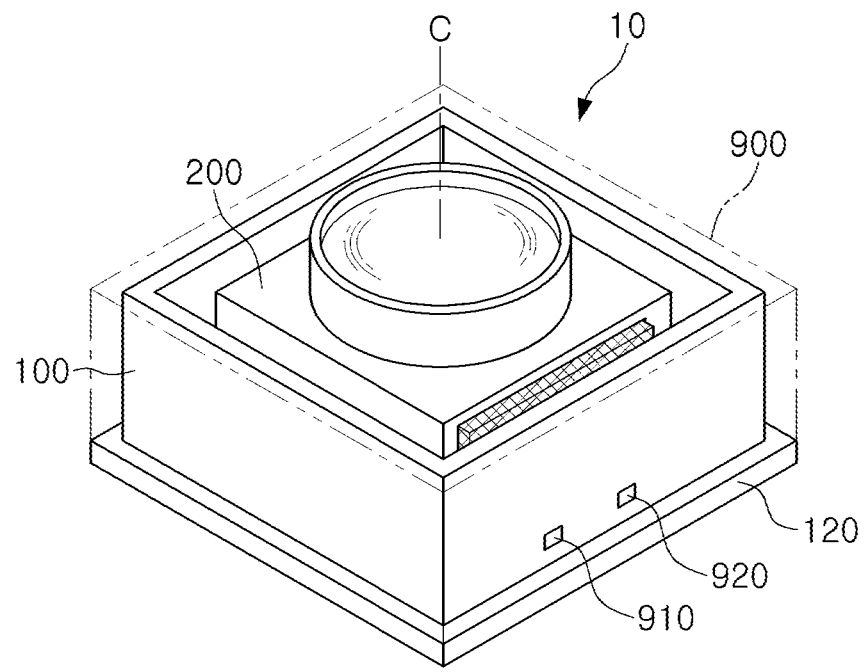
FIG. 6 is a coupled perspective view of the camera module shown in FIG. 1.

Referring to FIGS. 6 and 7, the camera module 10 may be manufactured in a compact size to be mounted on a portable terminal. The camera module 10 may be configured to enable focus adjustment. For example, the lens module 200 may move along an optical axis C, and may thereby adjust a focus of the camera module 10. The movement of the lens module 200 may be performed by the first driving assembly 300. For example, the lens module 200 may be moved in the optical axis C direction by a magnetic force generated between the first driving coil 310 and the first driving magnet 320.

The camera module 10 may be connected to an external electronic device. For example, the connection terminals 910 and 920 of the camera module 10 may be electrically connected to a control unit, or controller, of a portable terminal or other electronic devices.

Figure 8:
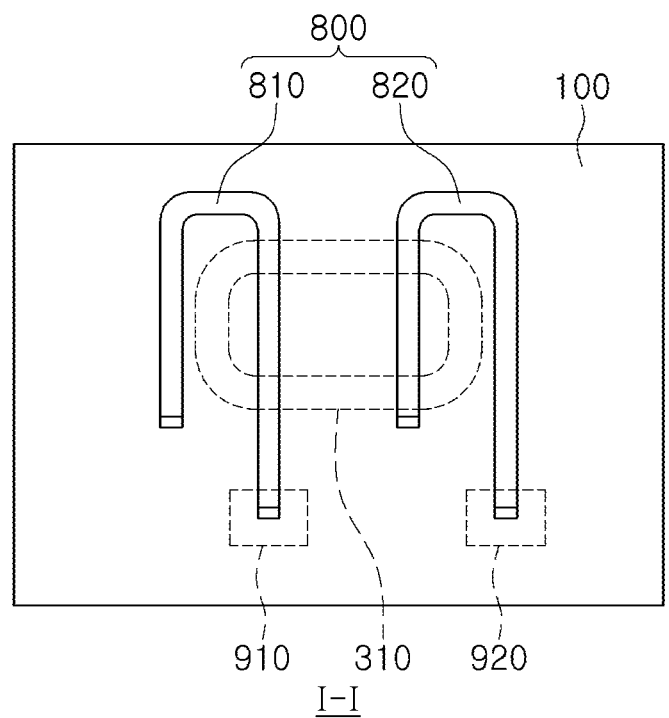
FIGS. 8 and 9 are cross-sectional views of the camera module shown in FIG. 1.
Figure 9:
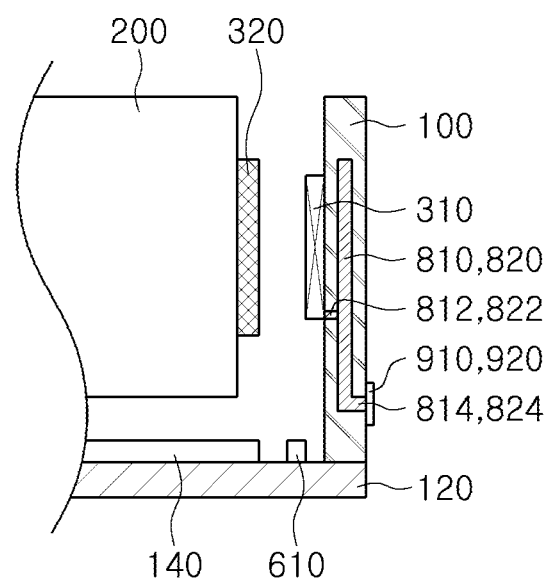

Referring to FIGS. 6 to 9, the camera module 10 may enable a connection to be easily made between the first driving coil 310 and the connection terminals 910 and 920. For example, the first driving coil 310 and the connection terminals 910 and 920 may be electrically connected by the reinforcing structure 800 (e.g., the first reinforcing member 810 and the second reinforcing member 820), which may be integrally formed in the housing 100, as shown in FIGS. 8 and 9.

The camera module 10 may include a first detection sensor 610 for detecting the position or displacement of the lens module 200, as shown in FIG. 1. The first detection sensor 610 may detect the position of the lens module 200 through a magnetic field generated from the first driving magnet 320 disposed in the lens module 200. The first detection sensor 610 may be disposed at a position capable of detecting the magnetic field of the first driving magnet 320 while being less affected by the first driving coil 310. For example, the first detection sensor 610 may be disposed on the circuit board 120 on which the image sensor 140 is mounted. However, the position of the first detection sensor 610 is not limited to the circuit board 120.

Figure 10:
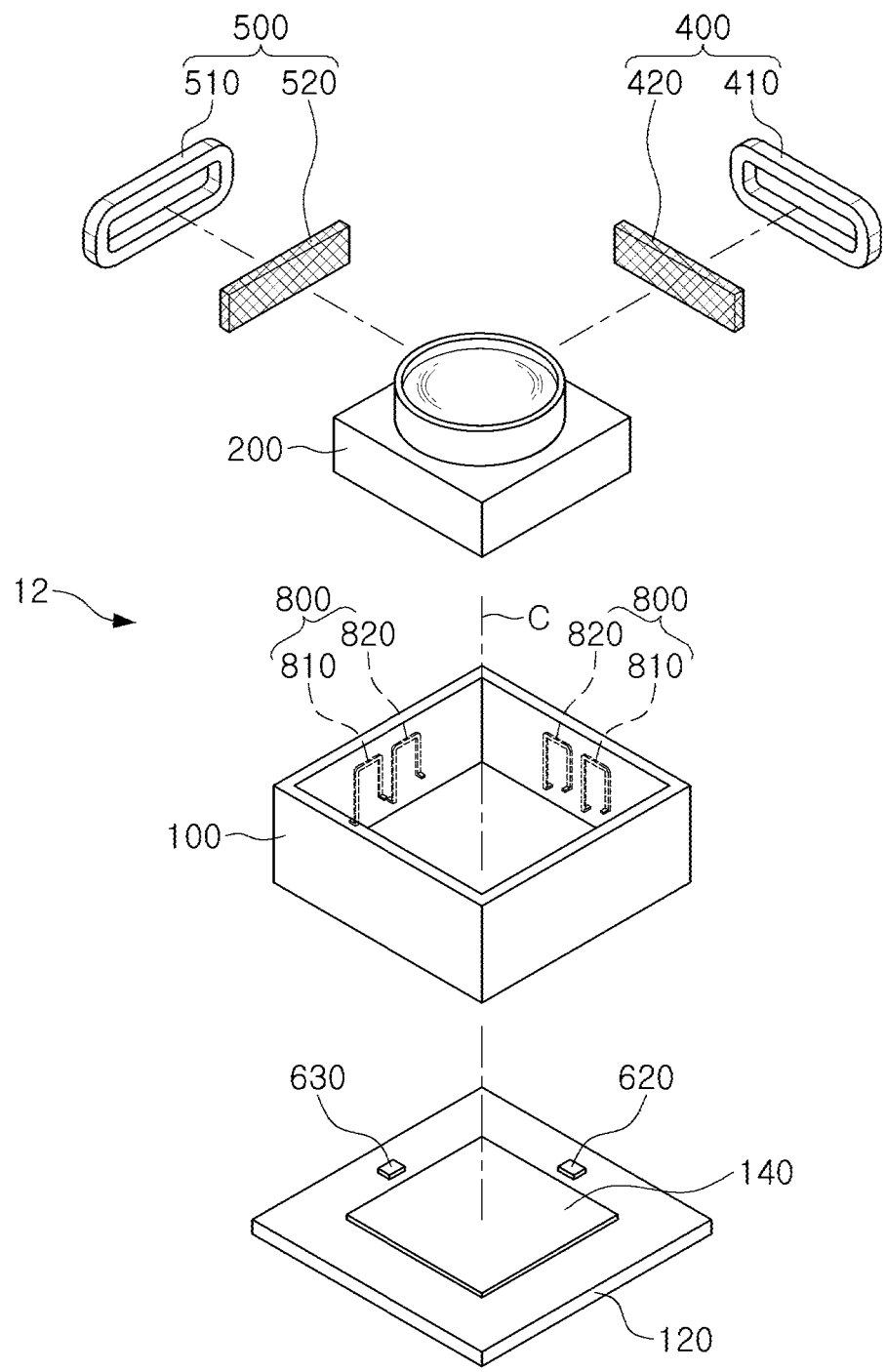
FIG. 10 is an exploded perspective view of a camera module, according to an embodiment.
Figure 11:
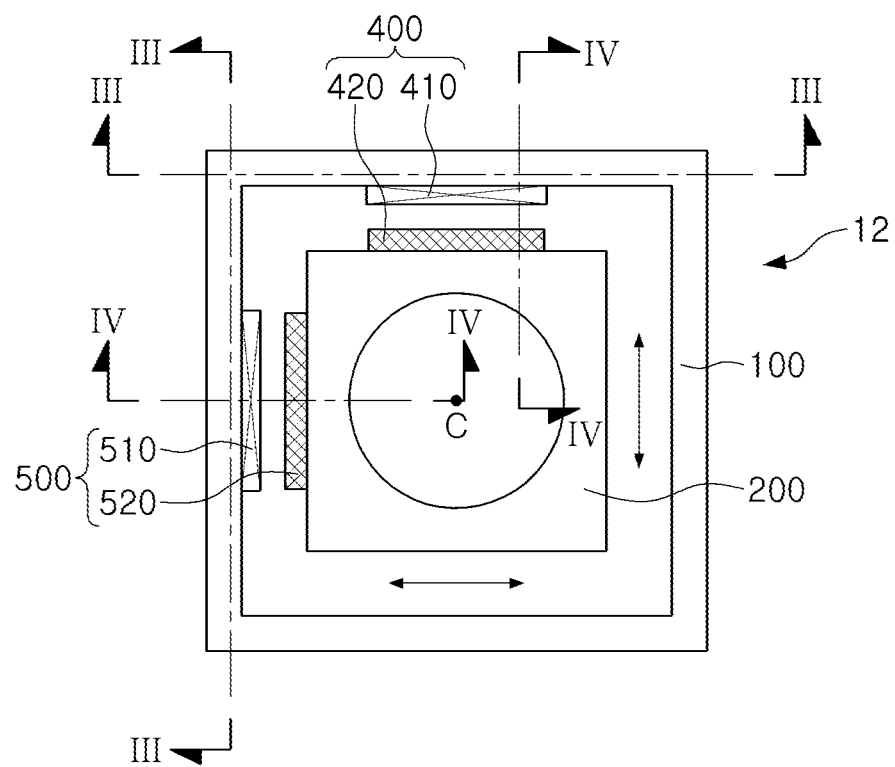
FIG. 11 is a plan view of the camera module shown in FIG. 10.
Figure 12:
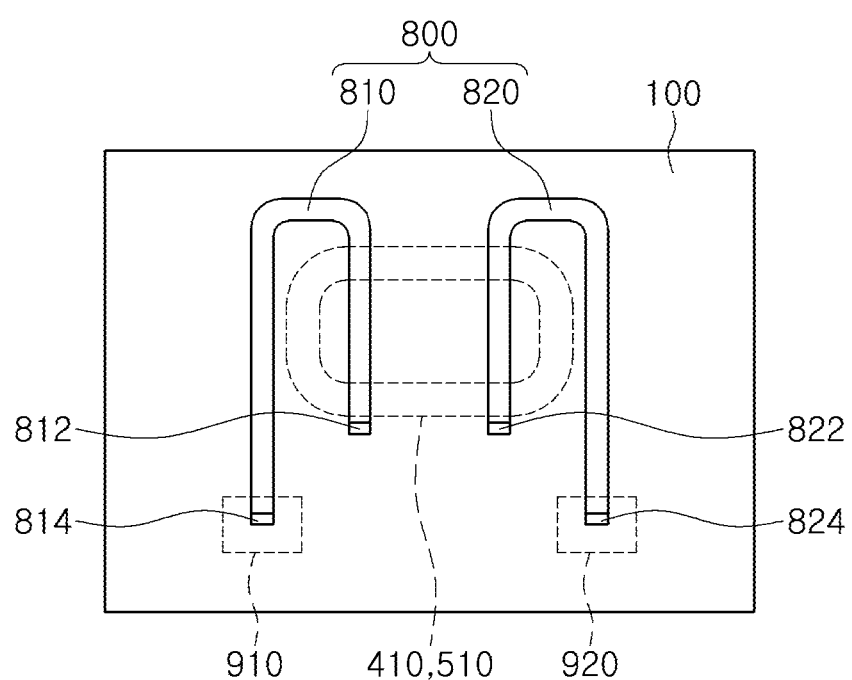
FIGS. 12 and 13 are cross-sectional views along lines III-III and IV-IV, respectively, of FIG. 11.

FIGS. 10 to 12 illustrate a camera module 12, according to an embodiment.

Referring to FIG. 10, the camera module 12 may include, for example, the housing 100, the circuit board 120, the image sensor 140, the lens module 200, second driving assemblies 400 and 500, and the reinforcing structure 800. However, the configuration of the camera module 12 is not limited to the aforementioned members. For example, the camera module 12 may further include second detection sensors 620 and 630 and the connection terminals 910 and 920.

The housing 100 may be made of a plastic material. For example, the housing 100 may be manufactured by injection molding. The housing 100 is configured to receive the lens module 200. For example, a space sufficient to completely receive the lens module 200 may be formed inside the housing 100. The housing 100 may have a form in which an upper portion and a lower portion of the housing 100 are open, so that light incident along the optical axis C can be imaged on the image sensor 140, which is disposed below the housing 100. The housing 100 may be generally in a form of a face having a plurality of side surfaces. For example, the housing 100 may have a shape similar to a hexahedron having four sides, as shown in FIG. 10. However, the shape of the housing 100 is not limited to the shape shown in FIG. 10. For example, the housing 100 may have a cylindrical shape with a curved side surface.

The circuit board 120 may be disposed in the housing 100. For example, the circuit board 120 may be disposed below the housing 100. The circuit board 120 may be electrically connected to the image sensor 140. For example, the circuit board 120 may be formed with an electric circuit configured to transmit an electric signal from the image sensor 140 to external or other electronic components. The circuit board 120 may be composed of a single-layer or multilayer substrate. For example, the circuit board 120 may be manufactured in a form in which an insulating layer and a plating layer on which an electric circuit is formed are sequentially stacked. An electronic component may be mounted on the circuit board 120. For example, one or more electronic components required for driving the camera module 12 may be disposed above or inside the circuit board 120.

The image sensor 140 is configured to convert an optical signal into an electrical signal. For example, the image sensor 140 may be manufactured in a CCD form. However, the image sensor 140 is not limited to the CCD form. For example, the image sensor 140 may be manufactured in a CMOS form. The image sensor 140 may be disposed on the circuit board 120. For example, the image sensor 140 may be mounted on an upper portion of the circuit board 120. The image sensor 140 may be electrically connected to the circuit board 120. For example, the image sensor 140 may be connected to an electrical circuit of the circuit board 120, and may be configured to transmit the converted electrical signal externally through the circuit board 120.

The lens module 200 may be configured to image light reflected from an object on the image sensor 140. For example, the lens module 200 may image light incident through one or more lenses on the image sensor 140. The lens module 200 may be driven inside the housing 100. For example, the lens module 200 may be moved along the optical axis C for focus adjustment.

The second driving assemblies 400 and 500 may perform image stabilization of the camera module 12. For example, the second driving assemblies 400 and 500 may drive the lens module 200 in a direction intersecting the optical axis C as shown in FIG. 11. The second driving assemblies 400 and 500 may include second driving coils 410 and 510, respectively, and second driving magnets 420 and 520, respectively. However, the configuration of the second driving assemblies 400 and 500 is not limited to the above-described members. The second driving coils 410 and 510 may be disposed in the housing 100. For example, the second driving coils 410 and 510 may be disposed on two side surfaces of the housing 100, respectively, so as to face two respective side surfaces of the lens module 200. The second driving magnets 420 and 520 may be disposed on the lens module 200. For example, the second driving magnets 420 and 520 may be disposed on two side surfaces of the lens module 200 so as to face the second driving coils 410 and 520, respectively. The second driving coils 410 and 510 and the second driving magnets 420 and 520 may provide driving force required for driving the lens module 200. For example, the magnetic force generated between the second driving coils 410 and 510 and the second driving magnets 420 and 520, respectively, may move the lens module 200 in a first direction or a second direction intersecting the optical axis C.

The reinforcing structure 800 is formed in the housing 100. For example, the reinforcing structure 800 may be formed on one side surface of the housing 100, or two or more reinforcing structures 800 may be respectively formed on two or more side surfaces of the housing 100. The reinforcing structure 800 may be made of a material different from a material of the housing 100. For example, the reinforcing structure 800 may be made of a metal material. However, the material of the reinforcing structure 800 is not limited to metal. The reinforcing structure 800 may be configured to increase the rigidity of the housing 100. For example, the reinforcing structure 800 may be integrally formed with the housing 100 by an insert injection method to improve the rigidity of the housing 100.

FIGS. 10 to 12 illustrate an example including two reinforcing structures 800. The reinforcing structures 800 may be electrically connected to the second driving coils 410 and 510, respectively. For example, first ends 812 and 822 of the each of the reinforcing structures 800 may be respectively connected to the second driving coils 410 and 510, which are disposed inside the housing 100, to enable supply of current to the second driving coils 410 and 510. The reinforcing structures 800 may be electrically connected to the respective connection terminals 910 and 920 disposed outside the housing 100. For example, the second ends 814 and 824 of each of the reinforcing structures 800 may be connected to the respective connection terminals 910 and 920 to enable electrical connection between the second driving coils 410 and 510 and the respective connection terminals 910 and 920. For reference, in the embodiment illustrated in FIGS. 10 to 12, the reinforcing structures 800 are shown in one form, but may be modified to the form according to any one of FIGS. 3 to 5, as desired.

The second detection sensors 620 and 630 are configured to detect the position of the lens module 200. For example, the second detection sensors 620 and 630 may be configured to detect the displacement of the lens module 200 when the lens module 200 is shaken in a direction intersecting the optical axis. The second sensing sensors 620 and 630 may be disposed at a position that can easily detect the magnetic field of the second driving magnets 420 and 520, respectively. For example, the second detection sensors 620 and 630 may be disposed on the circuit board 120 on which the image sensor 140 is mounted. However, the positions of the second detection sensors 620 and 630 are not limited to the circuit board 120.

Figure 13:
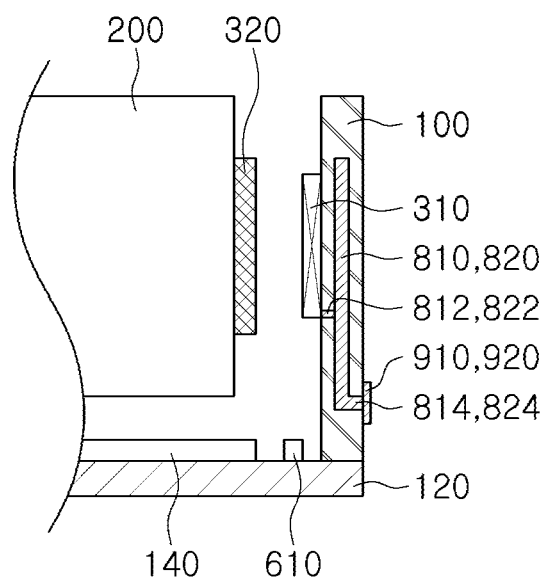

The camera module 12 configured as described above enable a connection to be easily made between the second driving coils 410 and 510 and the respective connection terminals 910 and 920. For example, the second driving coils 410 and 510 and the respective connection terminals 910 and 920 may be electrically connected by the respective reinforcing structures 800 (the first reinforcing member 810 and the second reinforcing member 820), which are integrally formed in the housing 100 as illustrated in FIGS. 12 and 13. Further, the camera module 12 may improve the rigidity of two side surfaces of the housing 100 through the reinforcing structures 800.

Figure 14:
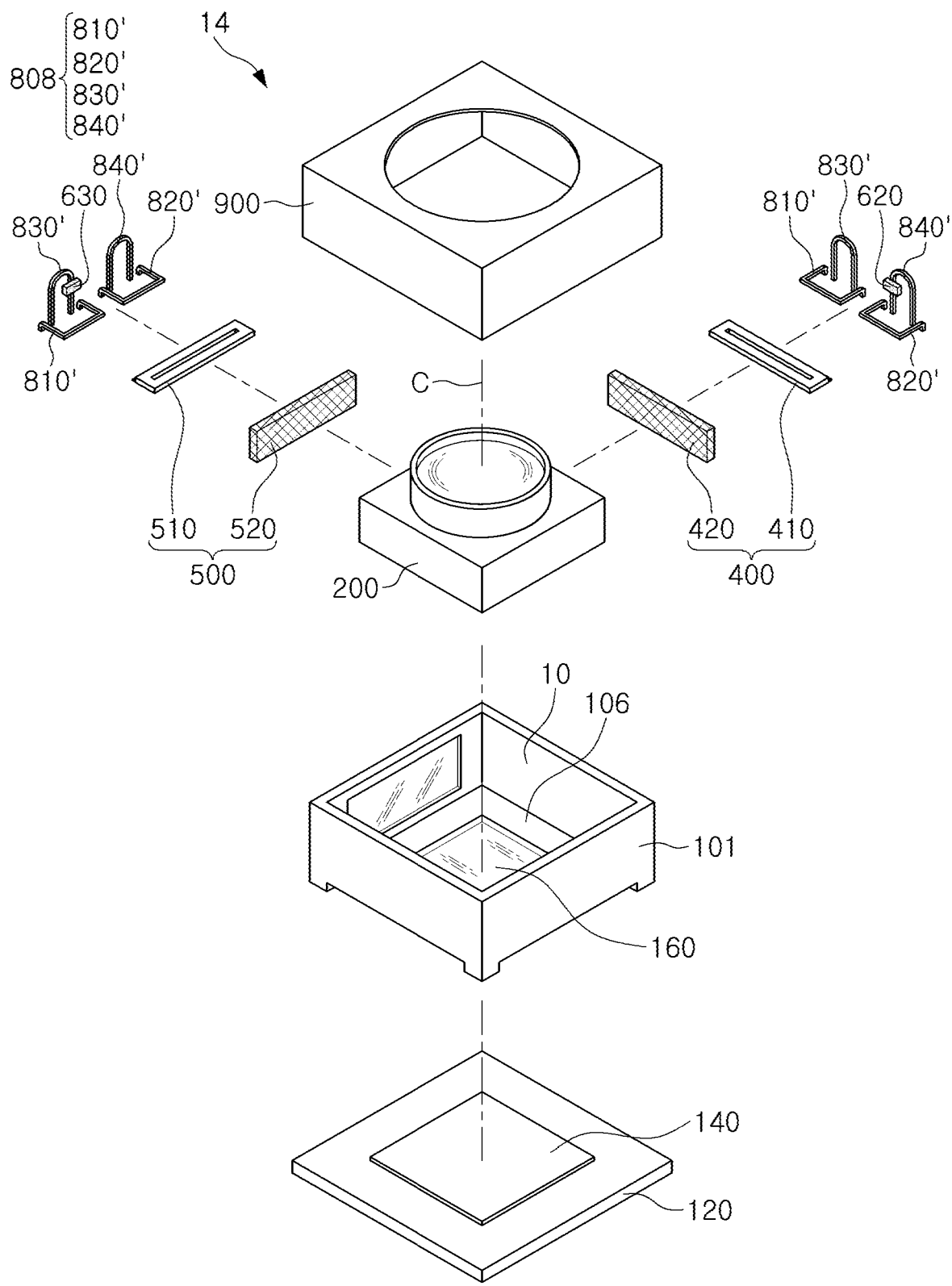
FIG. 14 is an exploded perspective view of a camera module, according to an embodiment.
Figure 15:
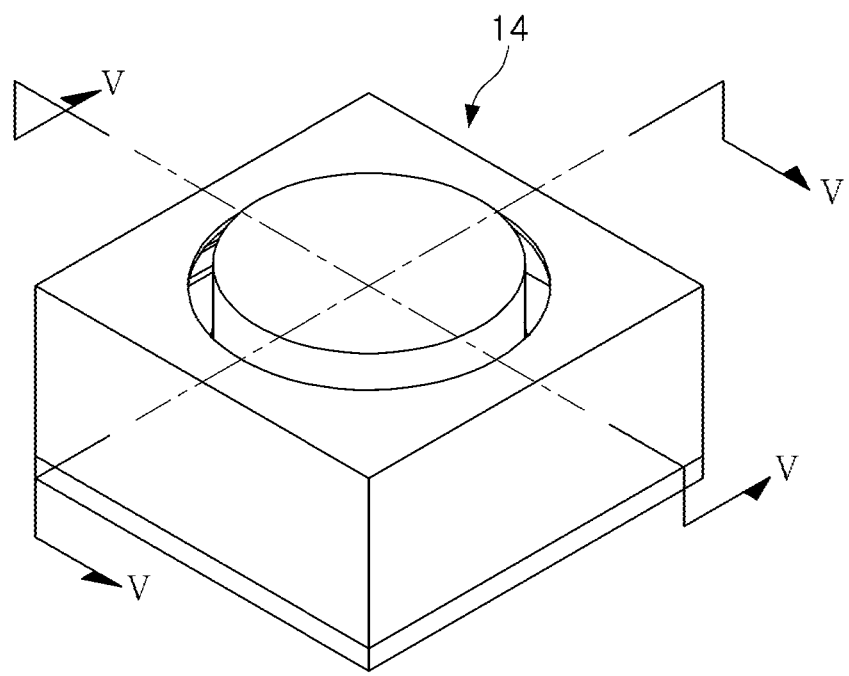
FIG. 15 is a coupled perspective view of the camera module shown in FIG. 14.
Figure 16:
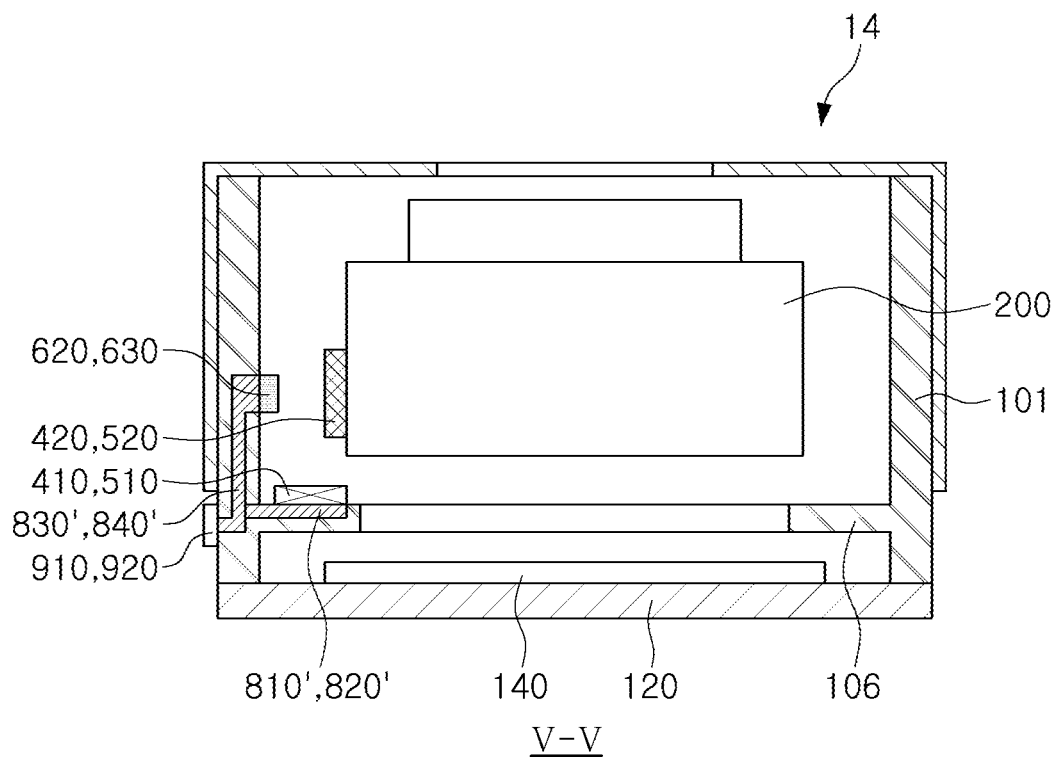
FIG. 16 is a cross-sectional view along line V-V of FIG. 15.

FIGS. 14 to 16 illustrate a camera module 14, according to an embodiment.

Referring to FIGS. 14 to 16, the camera module 14 may include, for example, a housing 101, the circuit board 120, the image sensor 140, the lens module 200, the second driving assemblies 400 and 500, and reinforcing structures 808. However, the configuration of the camera module 14 is not limited to these members. For example, the camera module 14 may further include the second detection sensors 620 and 630 and the connection terminals 910 and 920.

The housing 101 may be made of a plastic material. For example, the housing 101 may be manufactured by injection molding. The housing 101 is configured to receive the lens module 200. For example, a space sufficient to completely receive the lens module 200 may be formed inside the housing 101. The housing 101 may have a form in which an upper portion and a lower portion of the housing 101 are open, so that light incident along the optical axis C can be imaged on the image sensor 140, which is disposed below the housing 101. The housing 101 may be generally in a form of a surface having a plurality of side surfaces. For example, the housing 101 may have a shape similar to a hexahedron having four sides, as shown in FIG. 14. However, the shape of the housing 101 is not limited to the shape shown in FIG. 10. For example, the housing 101 may have a cylindrical shape with a curved side surface. A space for a filter member 160 to be disposed may be formed in the housing 101. For example, a flange portion 106 forming a predetermined size of transparent window may be formed in a lower portion of the housing 101.

The circuit board 120 may be disposed in the housing 101. For example, the circuit board 120 may be disposed below the housing 101. The circuit board 120 may be electrically connected to the image sensor 140. For example, the circuit board 120 may be formed with an electric circuit for transmitting an electric signal from the image sensor 140 to external or other electronic components. The circuit board 120 may be composed of a single-layer or multilayer substrate. For example, the circuit board 120 may be manufactured in a form in which an insulating layer and a plating layer on which an electric circuit is formed are sequentially stacked. An electronic component may be mounted on the circuit board 120. For example, one or more electronic components required for driving the camera module 14 may be disposed above or inside the circuit board 120.

The image sensor 140 is configured to convert an optical signal into an electrical signal. For example, the image sensor 140 may be manufactured in a CCD form. However, the image sensor 140 is not limited to the CCD form. For example, the image sensor 140 may also be manufactured in a CMOS form. The image sensor 140 may be disposed on the circuit board 120. For example, the image sensor 140 may be mounted on an upper portion of the circuit board 120. The image sensor 140 may be electrically connected to the circuit board 120. For example, the image sensor 140 may be connected to an electrical circuit of the circuit board 120, and may be configured to transmit the converted electrical signal externally through the circuit board 120.

The lens module 200 may be configured to image light reflected from an object on the image sensor 140. For example, the lens module 200 may image light incident through one or more lenses on the image sensor 140. The lens module 200 may be driven inside the housing 101. For example, the lens module 200 may be moved in the direction intersecting the optical axis by the second driving assemblies 400 and 500.

The second driving assemblies 400 and 500 are configured to perform image stabilization correction of the camera module 14. For example, the second driving assemblies 400 and 500 may drive the lens module 200 in a first direction or a second direction intersecting the optical axis C. The second driving assemblies 400 and 500 may include the second driving coils 410 and 510, respectively, and the second driving magnets 420 and 520, respectively. However, the configuration of the second driving assemblies 400 and 500 is not limited to the above-described members.

The second driving magnets 420 and 520 may be disposed on the lens module 200. For example, the second driving magnets 420 and 520 may be respectively disposed on two side surfaces of the lens module 200. The second driving coils 410 and 510 may be disposed in the housing 101. For example, the second driving coils 410 and 510 may be disposed on the flange portion 106 of the housing 101 so as to be disposed close to the second driving magnets 420 and 520, respectively.

The second driving coils 410 and 510 and the second driving magnets 420 and 520 may provide driving force required for driving the lens module 200. For example, magnetic force generated between the second driving coils 410 and 510 and the second driving magnets 420 and 520, respectively, may move the lens module 200 in a first direction or a second direction intersecting the optical axis C.

The reinforcing structures 808 are formed in the housing 101. For example, the reinforcing structures 808 may be formed on the sidewall 104 and the flange portion 106 of the housing 101. In other words, third and fourth reinforcing members 830' and 840' may be formed on the sidewall 104 of the housing 101, and first and second reinforcing members 810' and 820' may be formed on the flange portion 106 of the housing 106. The reinforcing structures 808 may be made of a material different from a material of the housing 101. For example, the reinforcing structure 808 may be made of a metal material. However, the material of the reinforcing structures 808 is not limited to metal. The reinforcing structures 808 may be configured to increase the rigidity of the housing 101. For example, the reinforcing structures 808 may be integrally formed with the housing 101 by an insert injection method to improve the rigidity of the sidewall 104 and the flange portion 106 of the housing 101.

The reinforcing structures 808 may be electrically connected to the second detection sensors 620 and 630, respectively, and the second driving coils 410 and 510, respectively. For example, the first reinforcing member 810' and the second reinforcing member 820' of one reinforcing structure 808 may be connected to the second driving coil 410, and the first reinforcing member 810' and the second reinforcing member 820' of the other reinforcing structure 808 may be connected to the second driving coil 510. For example, the third reinforcing member 830 and the fourth reinforcing member 840 of the one reinforcing structure 808 may be connected to the second detection sensor 620, and the third reinforcing member 830 and the fourth reinforcing member 840 of the other reinforcing structure 808 may be connected to the second detection sensor 630. The reinforcing structures 808 may respectively connect the second driving coils 410 and 510 to the connection terminals 910 and 920. For example, the respective first reinforcing members 810' and second reinforcing members 820' may connect the second driving coils 410 and 510 to the connection terminals 910 and 920. Similarly thereto, the respective reinforcing structures 808 may connect the second detection sensors 620 and 630 to the connection terminals 910 and 920. For example, the respective third reinforcing member 830 and fourth reinforcing member 840 may connect the second detection sensors 630 and 620 and the connection terminals 910 and 920. For reference, the reinforcing structures 808 are shown in one form, but may be modified to the form according to FIGS. 3 to 5, as desired.

The second detection sensors 620 and 630 are configured to detect the position of the lens module 200. For example, the second detection sensors 620 and 630 may be configured to detect the displacement of the lens module 200 when the lens module 200 is shaken in a direction intersecting the optical axis. The second sensing sensors 620 and 630 may be disposed at positions that can easily detect a magnetic field of the second driving magnets 420 and 520. For example, the second detection sensors 620 and 630 may be disposed on the sidewall 104 of the housing 101. However, the positions of the second detection sensors 620 and 630 are not limited to the sidewall 104 of the housing 101.

In the camera module 14 configured as described above, an electrical connection between the second driving coils 410 and 510 and the connection terminals 910 and 920, and an electrical connection between the second detection sensors 620 and 630 and the connection terminals 910 and 920 may be easily formed. Further, the camera module 14 may improve the rigidity of the sidewall 104 and the flange portion 106 of the housing 101 by including a plurality of reinforcing structures 808. Therefore, the camera module 14 may not only enable thinning and miniaturization of the housing 101, but may also improve the impact resistance of the housing 101 to external impacts.

Figure 17:
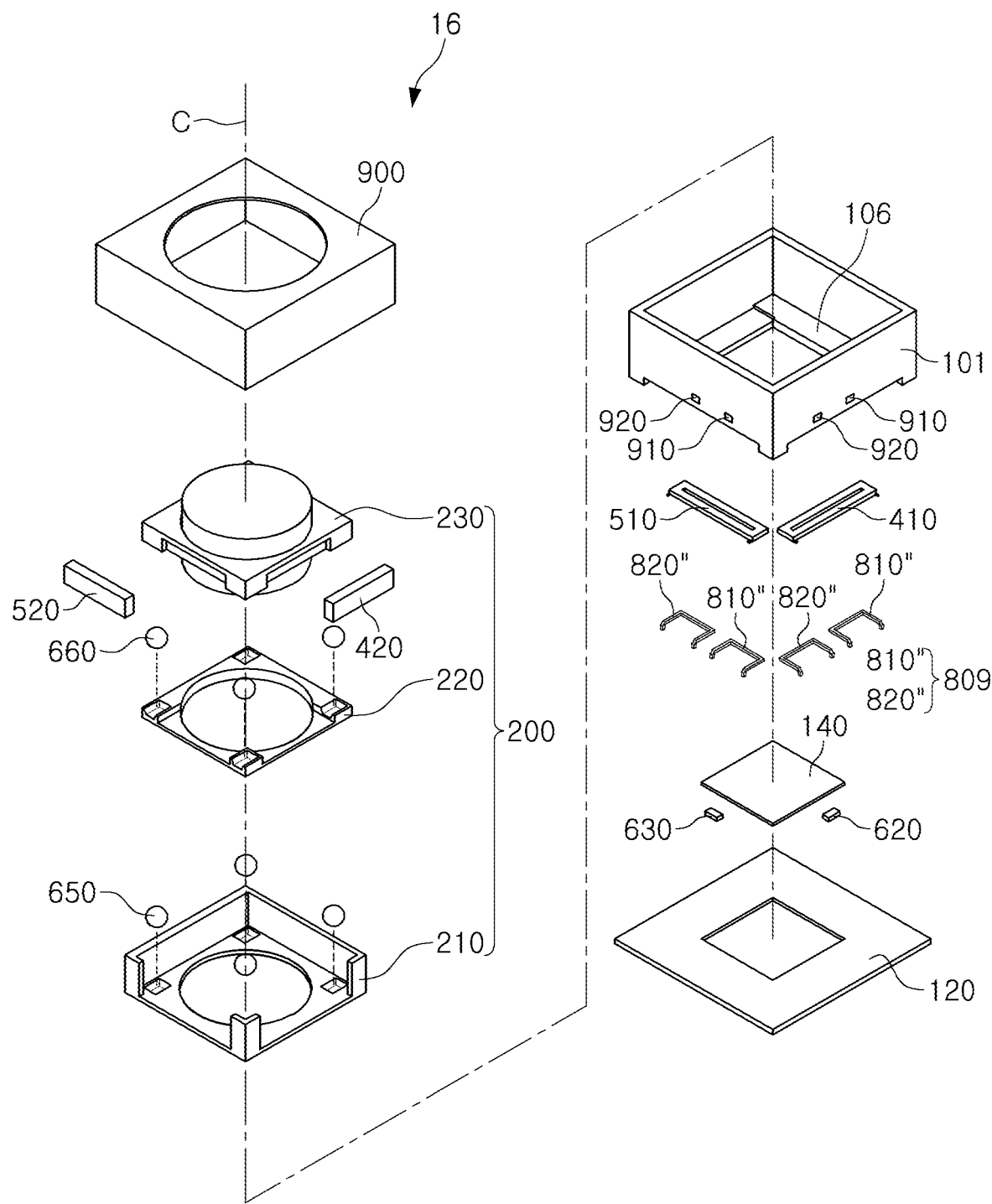
FIG. 17 is an exploded perspective view of a camera module, according to an embodiment.
Figure 18:
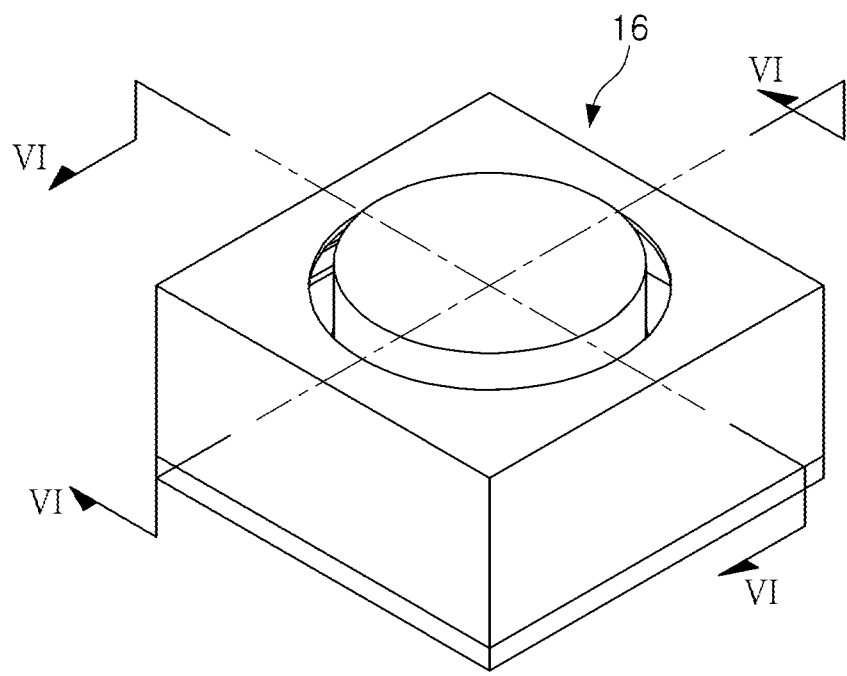
FIG. 18 is a coupled perspective view of the camera module shown in FIG. 17.
Figure 19:
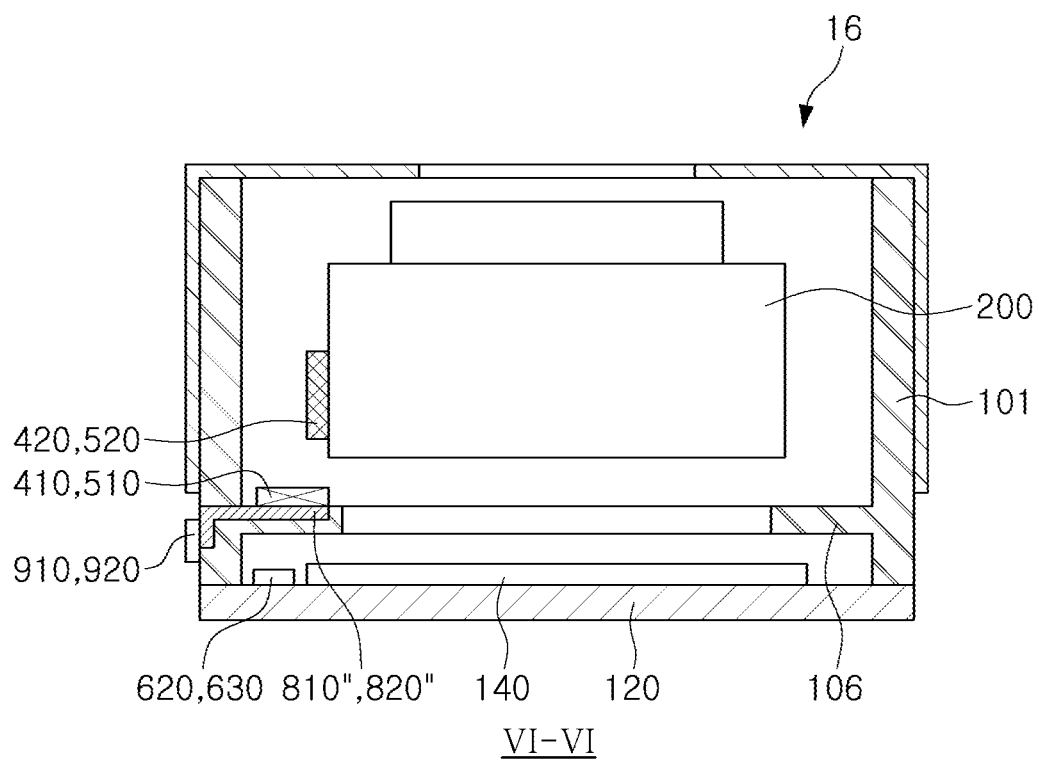
FIG. 19 is a cross-sectional view along line VI-VI of FIG. 18.

FIGS. 17 to 19 illustrate a camera module 16, according to another embodiment.

Referring to FIGS. 17 to 19, the camera module 16 may include, for example, the housing 101, the circuit board 120, the image sensor 140, the lens module 200, the second driving assemblies 400 and 500, and reinforcing members 809. However, the configuration of the camera module 16 is not limited to these members. For example, the camera module 16 may further include the second detection sensors 620 and 630 and the connection terminals 910 and 920.

The housing 101 may be made of a plastic material. For example, the housing 101 may be manufactured by injection molding. The housing 101 is configured to receive the lens module 200. For example, a space sufficient to completely receive the lens module 200 may be formed inside the housing 101. The housing 101 may have a form in which an upper portion and a lower portion thereof are open, so that light incident along the optical axis C can be imaged on the image sensor 140 disposed below the housing 101. The housing 101 may be generally in a form of a face having a plurality of side surfaces. For example, the housing 101 may have a shape similar to a hexahedron having four side surfaces as shown in FIG. 17. However, the shape of the housing 101 is not limited to the shape shown in FIG. 17. For example, the housing 101 may have a cylindrical shape with a curved side surface. A space for the filter member 160 (FIG. 14) to be disposed may be formed in the housing 101. For example, the flange portion 106 forming a transparent window of a predetermined size may be formed below the housing 101.

The circuit board 120 may be disposed in the housing 101. For example, the circuit board 120 may be disposed below the housing 101. The circuit board 120 may be electrically connected to the image sensor 140. For example, the circuit board 120 may be formed with an electric circuit for transmitting an electric signal from the image sensor 140 to external or other electronic components. The circuit board 120 may be composed of a single-layer or multilayer substrate. For example, the circuit board 120 may be manufactured in a form in which an insulating layer and a plating layer on which an electric circuit is formed are sequentially stacked. An electronic component may be mounted on the circuit board 120. For example, one or more electronic components required for driving the camera module 16 may be disposed above or inside the circuit board 120.

The image sensor 140 is configured to convert an optical signal into an electrical signal. For example, the image sensor 140 may be manufactured in a CCD form. However, the image sensor 140 is not limited to the CCD form. For example, the image sensor 140 may be manufactured in a CMOS form. The image sensor 140 may be disposed on the circuit board 120. For example, the image sensor 140 may be mounted on an upper portion of the circuit board 120. The image sensor 140 may be electrically connected to the circuit board 120. For example, the image sensor 140 may be connected to an electrical circuit of the circuit board 120 and transmit the converted electrical signal externally through the circuit board 120.

The lens module 200 may be configured to image light reflected from an object on the image sensor 140. For example, the lens module 200 may image light incident through one or more lenses on the image sensor 140.

The lens module 200 may be configured to be easily moved in a direction intersecting the optical axis C. For example, the lens module 200 may include a first frame 210, a second frame 220, and a third frame 230. The second frame 220 may be configured to move in a first direction intersecting the optical axis with respect to the first frame 210, and the third frame 230 may be configured to be moved in a second direction intersecting the optical axis with respect to the second frame 220. Ball bearings 650 may be disposed between the first frame 210 and the second frame 220, and ball bearings 660 may be disposed between the second frame 220 and the third frame 230.

The second driving assemblies 400 and 500 are configured to perform image stabilization correction of the camera module 16. For example, the second driving assemblies 400 and 500 may drive the lens module 200 in the first direction or the second direction intersecting the optical axis C. The second driving assemblies 400 and 500 may include the second driving coils 410 and 510, respectively, and the second driving magnets 420 and 520, respectively. However, the configuration of the second driving assemblies 400 and 500 is not limited to the above-described members.

The second driving magnets 420 and 520 may be disposed on the lens module 200. For example, the second driving magnets 420 and 520 may be respectively disposed on two side surfaces of the lens module 200. The second driving coils 410 and 510 may be disposed in the housing 101. For example, the second driving coils 410 and 510 may be disposed on the flange portion 106 of the housing 101 so as to be disposed close to the second driving magnets 420 and 520, respectively.

The second driving coils 410 and 510 and the second driving magnets 420 and 520 may provide driving force required for driving the lens module 200. For example, the magnetic force generated between the second driving coils 410 and 510 and the second driving magnets 420 and 520, respectively, may move the lens module 200 in the first direction or the second direction intersecting the optical axis C.

The reinforcing structures 809 are formed in the housing 101. For example, the reinforcing structures 809 may be formed on the flange portion 106 of the housing 101. The reinforcing structures 809 may be made of a material different from a material of the housing 101. For example, the reinforcing structures 809 may be made of a metal material. However, a material of the reinforcing structures 809 is not limited to metal. The reinforcing structures 809 may be configured to increase the rigidity of the housing 101. For example, the reinforcing structures 809 may be integrally formed with the housing 101 by an insert injection method to improve the rigidity of the sidewall 104 and the flange portion 106 of the housing 101.

The reinforcing structures 809 may be electrically connected to the second driving coils 410 and 510, respectively. For example, a first reinforcing member 810" and a second reinforcing member 820" of one reinforcing structure 809 may be connected to the second driving coil 410, and a reinforcing member 810" and a second reinforcing member 820" of the other reinforcing structure 809 may be connected to the second driving coil 510. The respective reinforcing structures 809 may connect the second driving coils 410 and 510 to the connection terminals 910 and 920. For example, the respective first reinforcing members 810" and second reinforcing members 820" may connect the second driving coils 410 and 510 to the connection terminals 910 and 920. For reference, in the embodiment illustrated in FIGS. 17 to 19, the reinforcing structure 809 is shown in one form, but may be modified to the form according to FIGS. 3 to 5, as desired.

The second detection sensors 620 and 630 are configured to detect the position of the lens module 200. For example, the second detection sensors 620 and 630 may be configured to detect the displacement of the lens module 200 when the lens module 200 is shaken in a direction intersecting the optical axis. The second detection sensors 620 and 630 may be disposed at positions that can easily detect the magnetic field of the second driving magnets 420 and 520, respectively. For example, the second detection sensors 620 and 630 may be disposed on the circuit board 120 on which the image sensor 140 is mounted.

The camera module 16 configured as described above enables easy electrical connection between the second driving coils 410 and 510 and the connection terminals 910 and 920. Further, the camera module 16 may improve the rigidity of the flange portion 106 by including the reinforcing structures 809.

FIGS. 20 to 25 illustrate a camera module 18, according to an embodiment.

Figure 20:
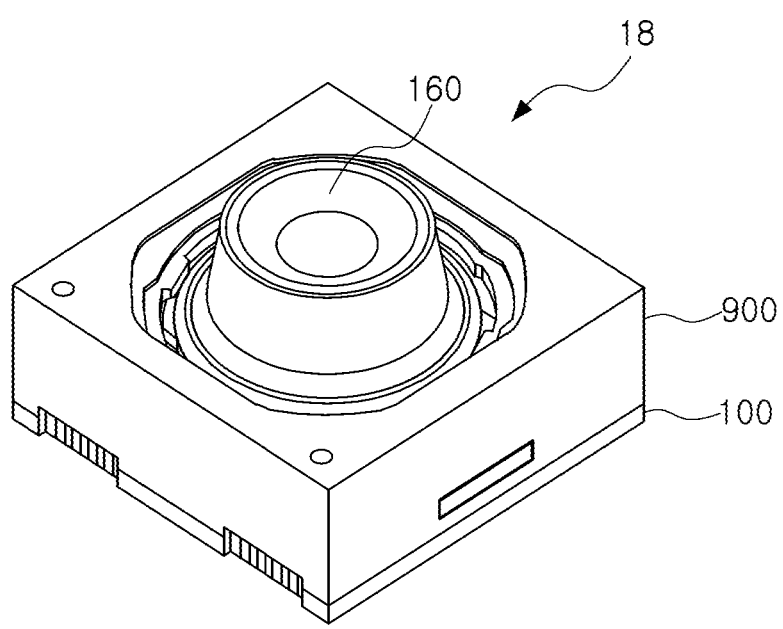
FIG. 20 is a coupled perspective view of a camera module, according to an embodiment.
Figure 21:
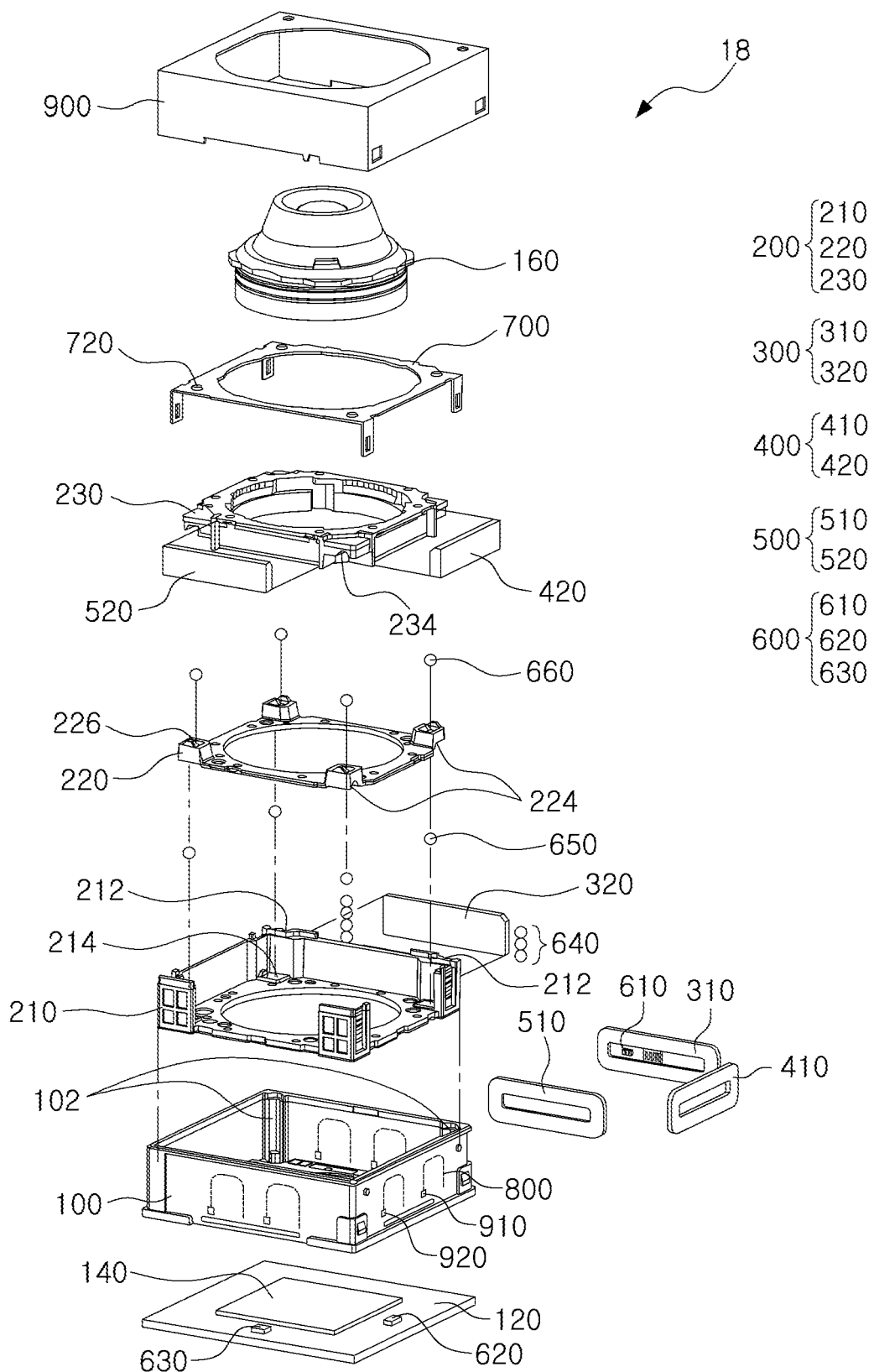
FIG. 21 is an exploded perspective view of the camera module shown in FIG. 20.

The camera module 18 may include, for example, the housing 100, a lens barrel 250, the lens module 200, the first driving assembly 300, and the second driving assemblies 400 and 500, as shown in FIGS. 20 and 21. However, the configuration of the camera module 18 is not limited to above-described members. For example, the camera module 18 may further include the circuit board 120, the image sensor 140, the detection sensors 610, 620, and 630, first, second, and third ball bearings 640, 650, and 660, a cover member 700, reinforcing structures 800, and the shield can 900.

Figure 22:
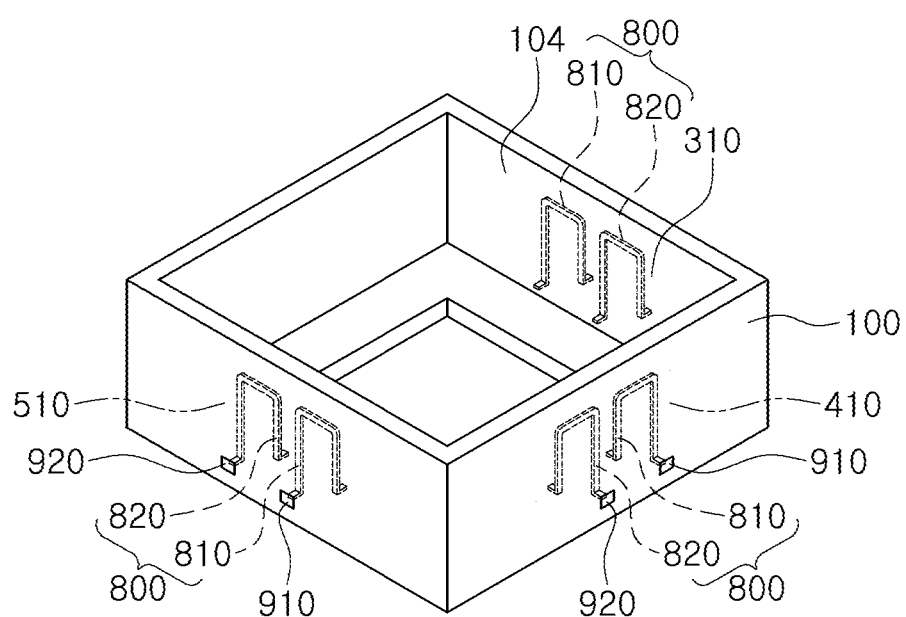
FIG. 22 is an enlarged perspective view of a housing shown in FIG. 20.
Figure 23:
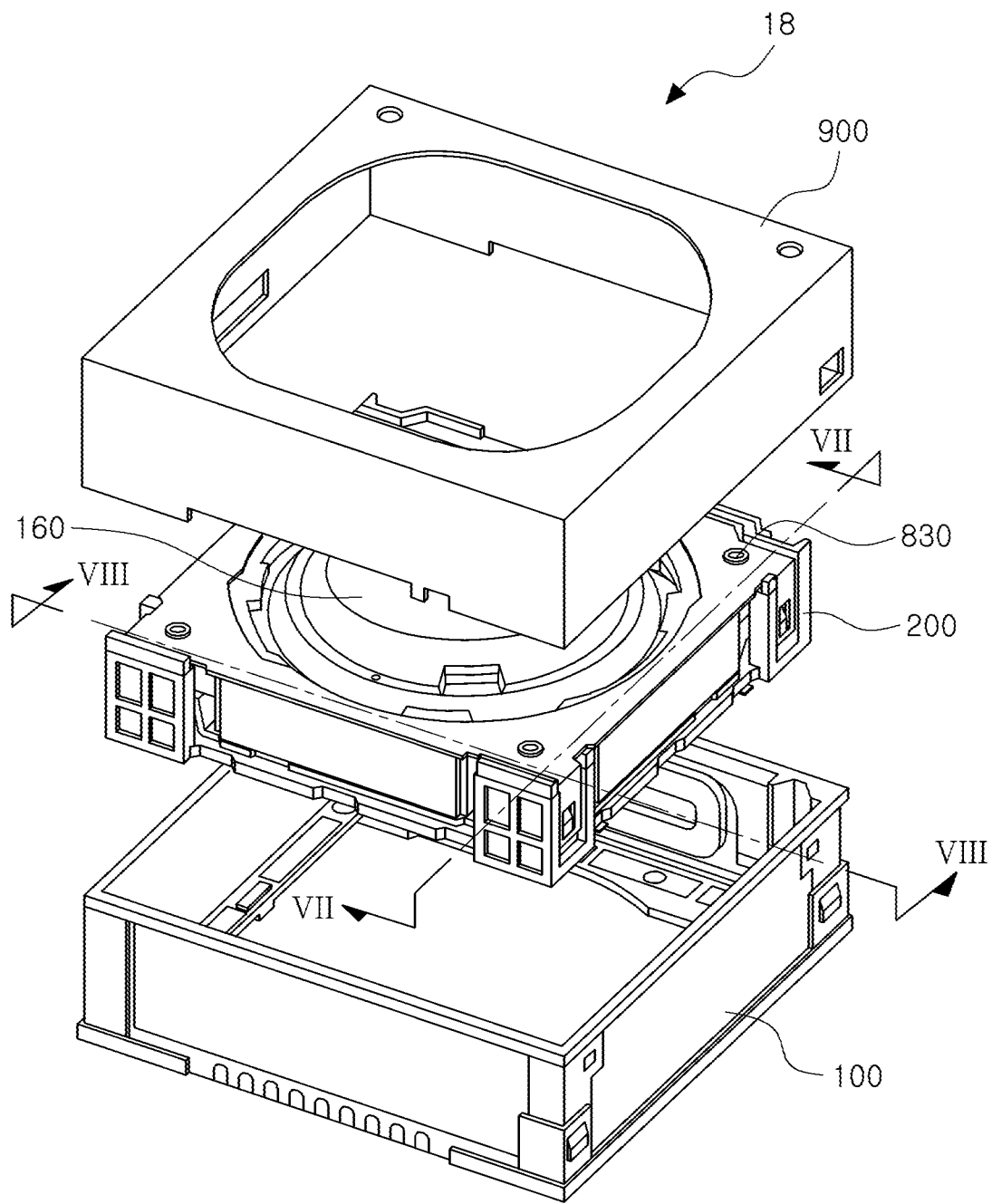
FIG. 23 is a partially coupled perspective view of the camera module shown in FIG.

Referring to FIGS. 21 and 22, the housing 100 may be formed in a form of a face having upper and lower surfaces open. For example, the housing 100 may be configured to have a substantially hexahedral shape. Three side surfaces of the housing 100 may have partially incised shapes. The driving forces of the first driving assembly 300 and the second driving assemblies 400 and 500 may be transmitted to the lens module 200 through the incised side surfaces. A pair of first guide grooves 102 may be formed inside the first surface of the housing 100. The first guide groove 102 may be formed long along the height direction of the housing 100. A first ball bearing 640 may be disposed in the first guide groove 102.

The lens module 200 is disposed inside the housing 100. The lens module 200 may be configured to move in a direction of the optical axis and in a direction intersecting the optical axis, inside the housing 100. The lens module 200 may be composed of a plurality of members. For example, the lens module 200 may be composed of the first frame 210, the second frame 220, and the third frame 230.

The first frame 210 may have a form in which the vertical direction is open, and the frame 210 has two closed sides and two open sides. A pair of second guide grooves 212 may be formed on the first surface of the first frame 210. The first ball bearing 640 may be disposed in the second guide groove 212. The first frame 210 is disposed inside the housing 100. The first frame 210 may be configured to move in the optical axis direction with respect to the housing 100. For example, the first frame 210 may move in the optical axis direction in a state of a point contact or line contact with the first ball bearing 640. The driving force required for driving the first frame 210 may be provided by the first driving assembly 300. A first groove 214 may be formed in four inner corners of the first frame 210. The first groove 214 may have a shape elongated in a longitudinal direction. For example, the first groove 214 may be formed long along a first direction intersecting the optical axis. The second ball bearing 650 may be disposed in the first groove 214.

The second frame 220 may have a generally thin plate shape that is open in the vertical direction. The second frame 220 is disposed on the first frame 210, and may be configured to be moved in the first direction intersecting the optical axis. For example, the second frame 220 may be enabled to move in the first direction intersecting the optical axis by the second ball bearing 650 being disposed between the first frame 210 and the second frame 220. The driving force required for driving the second frame 220 may be provided by the second driving assembly 400. A second groove 224 and a third groove 226 may be formed in the second frame 220. The second groove 224 may be formed below the second frame 220, and the third groove 226 may be formed above the second frame 220. The second groove 224 may be elongated in the first direction intersecting the optical axis. The second groove 224 may form a space for receiving the second ball bearing 650 together with the first groove 214. The third groove 226 may be elongated in a second direction intersecting the optical axis and the first direction.

The third frame 230 may have a shape that is open in the vertical direction and has a predetermined height. The third frame 230 may be disposed on the second frame 220 and may be configured to move in a second direction intersecting the optical axis. For example, the third frame 230 may be enabled move in the second direction intersecting the optical axis by the third ball bearing 660 being disposed between the second frame 220 and the third frame 230. The driving force required for driving the third frame 230 may be provided by the second driving assembly 400. A fourth groove 234 may be formed below the third frame 230. The fourth groove 234 may be elongated in the second direction intersecting the optical axis. The fourth groove 234 may form a space for accommodating the third ball bearing 660 together with the third groove 226.

The lens barrel 250 may be coupled to the third frame 230. The lens barrel 250 may be moved by the lens module 200 in an optical axis direction and a direction intersecting the optical axis. For example, the lens barrel 250 may be moved by the first frame 210 in the optical axis direction. As another example, the lens barrel 250 may be moved by the second frame 220 and the third frame 230 in the first direction intersecting the optical axis and the second direction intersecting the optical axis. The movement of the lens barrel 250 in the optical axis direction may enable focus adjustment of the camera module 18, and the movement of the lens barrel 250 in the first and second directions intersecting the optical axis of the lens module 250 may enable an image stabilization correction function of the camera module 18 to be performed.

The first driving assembly 300 may be configured to move the lens module 200 in the optical axis direction. For example, the first driving assembly 300 may provide driving force required to move the first frame 210 in the optical axis direction. The first driving assembly 300 may include the first driving coil 310 and the first driving magnet 320. The first driving coil 310 may be disposed on the first surface of the housing 100, and the first driving magnet 320 may be disposed on the first surface of the first frame 210. The first surface of the housing 100 and the first surface of the first frame 210 may be disposed to face each other.

The second driving assemblies 400 and 500 may be configured to move the lens module 200 in the first direction intersecting the optical axis and the second direction intersecting the optical axis. For example, the second driving assemblies 400 and 500 may provide driving force required for the movement of the second frame 220 and the third frame 230. The second driving assemblies 400 and 500 may include second driving coils 410 and 510, respectively, and second driving magnets 420 and 520, respectively. The second driving coils 410 and 510 may be disposed on the second and third surfaces of the housing 100, respectively, and the second driving magnets 420 and 520 may be disposed on the second and third surfaces of the third frame 230, respectively. For example, the second surface of the housing 100 may be a surface facing the second surface of the third frame 230, and the third surface of the housing 100 may be a surface facing the third surface of the third frame 230.

The camera module 18 may include a device for supplying current to driving assemblies 300, 400, and 500. For example, the camera module 18 may include the circuit board 120. The circuit board 120 may be configured to supply current required for driving the first driving assembly 300 and the second driving assemblies 400 and 500. For example, the circuit board 120 may supply current to the first driving coil 310 and the second driving coil 410, 510. The circuit board 120 may be configured to provide a space in which the first driving coil 320 and the second driving coils 410 and 510 can be disposed. For example, the circuit board 120 may be disposed in a form surrounding the first surface, the second surface, and the third surface of the housing 100, to provide a space in which the first driving coil 320 and the second driving coils 410 and 510 may be disposed in the housing 100. The image sensor 140 may be mounted on the circuit board 120.

The camera module 18 may include elements for detecting the position of the lens module 200. For example, the camera module 18 may include of the first detection sensor 610 and the second detection sensors 620 and 630. The first detection sensor 610 may detect moving displacement of the lens module 200 in the optical axis direction, and the second detection sensors 620 and 630 may detect the moving displacement of the lens module 200 in the first and second directions intersecting the optical axis. The first, second, and third detection sensors 610, 620, and 630 may each be in a form of a hall sensor configured to detect a magnitude of the magnetic field generated from the driving assemblies 300, 400, and 500, respectively. However, the shape of the first, second, and third detection sensors 610, 620, and 630 is not limited to the hall sensor. The first detection sensor 610 may be disposed in a space surrounded by the driving coil 310. For example, the first detection sensor 610 may be disposed inside the first driving coil 310. The second detection sensors 620 and 630 may be disposed on the circuit board 120 on which the image sensor 140 is mounted.

The camera module 18 may include a component for binding the first frame 210 to the third frame 230. For example, the camera module 18 may include the cover member 700 for binding the second frame 220 and the third frame 230 to the first frame 210. The cover member 700 may be coupled to the first frame 210 in a state in which the first frame 210 to the third frame 230 are stacked, so that it is possible to prevent separation of the second frame 220 and the third frame 230 from the first frame 210. A buffer member 720 may be formed on the cover member 700. For example, a plurality of buffer members 720 protruding upwardly may be formed on an upper portion of the cover member 700. The buffer member 720 formed as described above may reduce impacts due to collision between the lens module 200 and the shield can 900.

The camera module 18 may include a component for shielding electromagnetic waves. For example, the camera module 18 may include the shield can 900. The shield can 900 may be formed in a form surrounding the housing 100, the lens module 200, and the cover member 700. Therefore, harmful electromagnetic waves generated inside or outside the camera module 18 may be blocked or impeded by the shield can 900.

The camera module 18 includes the reinforcing structures 800 that may reinforce rigidity of the housing 100. For example, the reinforcing structures 800 may be formed inside a sidewall 104 of the housing 100 as shown in FIG. 22. The reinforcing structures 800 may be made of a material different from a material of the housing 100. For example, the reinforcing structures 800 may be made of a metal material. The reinforcing structures 800 may be integrally formed with the housing 100. For example, the reinforcing structures 800 formed of the metal material and the housing 100 formed of the plastic material may be integrally formed by double injection molding or insert injection molding. For example, the reinforcing structures 800 may each be composed of the first reinforcing member 810 and the second reinforcing member 820. The reinforcing structures 800 may be respectively connected to driving coils 310, 410, and 510. For example, the first end of the first reinforcing member 810 and the first end of the second reinforcing member 820 may be connected to a first terminal and a second terminal of the driving coils 310, 410, and 510, respectively. The reinforcing structures 800 may be connected to the respective connection terminals 910 and 920. For example, the second end of the first reinforcing member 810 and the second end of the second reinforcing member 820 may be connected to the connection terminals 910 and 920, respectively. Therefore, the driving coils 310, 410, and 510, which are located inside the housing 100, and the connection terminals 910 and 920, which are located outside the housing 100, may be electrically connected by the respective reinforcing structure 800. For example, in the embodiment illustrated in FIGS. 20-25, the reinforcing structures 800 are shown in one form, but may be modified to the form according to FIGS. 3 to 5, as desired.

A moving structure of the second frame 220 and the third frame 230 will be described below with reference to FIGS. 24 and 25.

Figure 24:
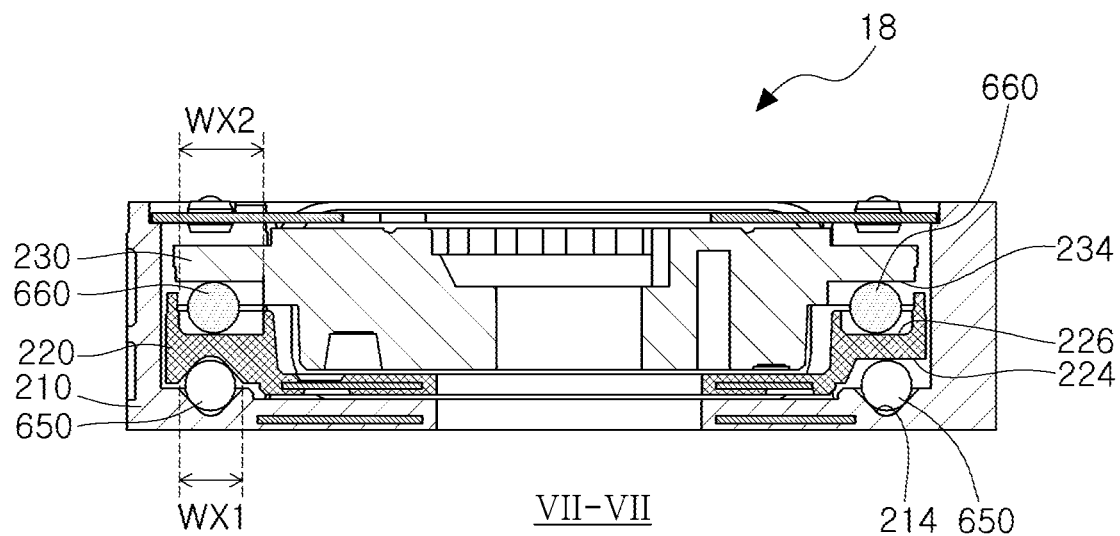
FIGS. 24 and 25 are cross-sectional views along lines VII-VII and VIII-VIII, respectively, of FIG. 23.
Figure 25:
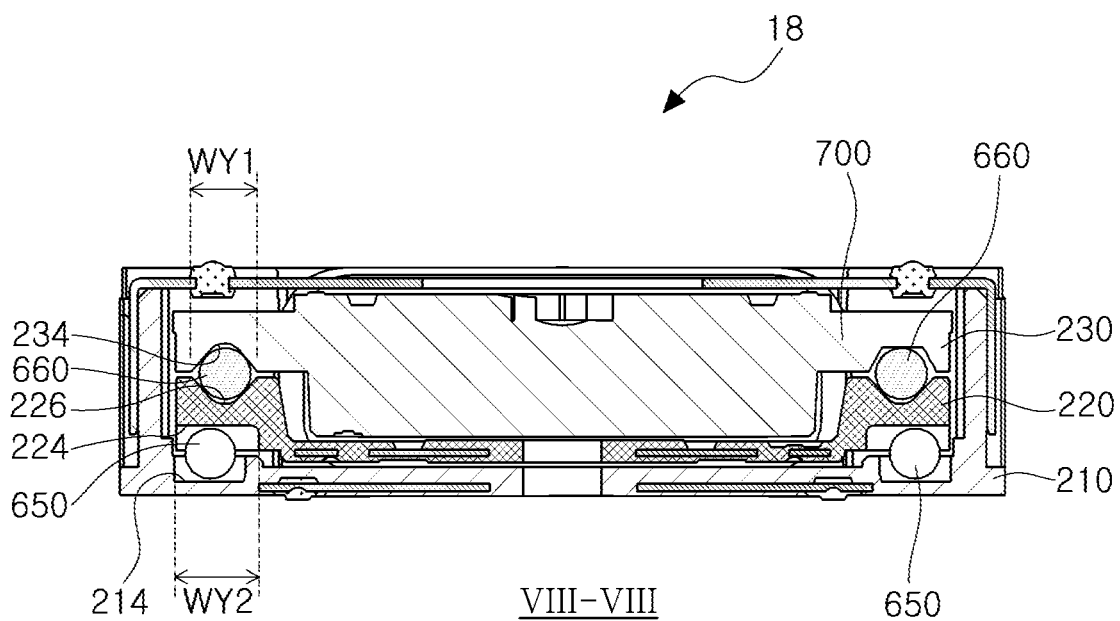

Referring to FIGS. 24 and 25, the first frame 210, the second frame 220, and the third frame 230 constituting the lens module 200 may be stacked and coupled along the optical axis direction. The first frame 210 may be configured to receive the second frame 220 and the third frame 230. For example, the second frame 220 and the third frame 230 may be configured to be moved in a direction intersecting the optical axis in a state in which the second frame 220 and the third frame 230 are received inside the first frame 210.

The second and third ball bearings 650 and 660 may be disposed between the first frame 210 and the third frame 230. For example, the second ball bearing 650 may be disposed between the first frame 210 and the second frame 220, and the third ball bearing 660 may be disposed between the second frame 220 and the third frame 230.

A space for the second and third ball bearings 650 and 660 to be disposed may be formed in the first frame 210 to the third frame 230. For example, the first groove 214 may be formed on an upper portion of the first frame 210, the second and third grooves 224 and 226 may be formed on upper and lower portions of the second frame 220, and the fourth groove 234 may be formed on a lower portion of the third frame 230.

Lengths of the second and fourth grooves 224 and 234 may be formed differently according to a moving direction of the second frame 220 and the third frame 230. For example, a length WY2 of the second groove 224 in a first direction may be greater than a length WX1 of the second groove 224 in a second direction, and a length WX2 of the fourth groove 234 in the second direction may be greater than a length WY1 of the fourth groove 234 in the first direction. Further, the length WY2 of the second groove 224 in the first direction may be greater than the length WY1 of the third and fourth grooves 226 and 234 in the first direction, and the length WX2 of the fourth groove 234 may be greater than the length WX1 of the first and second grooves 214 and 224 in the second direction.

Since the length of the second groove 224 of the second frame 220, configured as described above, in the first direction is greater than the length of the first groove 214 of the first frame 210 in the first direction, a relative movement of the second frame 220 with respect to the first frame 210 may be possible. In addition, since the length of the fourth groove 234 of the third frame 230 in the second direction is greater than the length of the third groove 226 of the second frame 220 in the second direction, a relative movement of the third frame 230 with respect to the second frame 220 may be possible.

Since, in the camera module 18, an electrical connection between the driving coils 310, 410, and 510 and the connection terminals 910, 920 is made by the reinforcing structures 800, there is no need to attach a flexible substrate for supplying current to the driving coils 310, 410, and 510 to the housing 100. In addition, since the camera module 18 may omit an attachment process of the flexible substrate, a manufacturing process of the camera module 18 may be simplified. In addition, since the camera module 18 may secure the rigidity of the housing 100 through the reinforcing structure 800, it is possible to make the housing 100 lightweight and miniaturized.

As set forth above, according to the disclosure herein, miniaturization of a camera module may be achieved while securing the rigidity of a housing of the camera module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. In addition, respective embodiments may be combined with each other. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing;
   a lens module disposed in the housing;
   a driving assembly configured to move the lens module in a direction of an optical axis or a direction intersecting the optical axis; and
   a reinforcing structure that is embedded within an inner side and an outer side of at least one sidewall of the housing, and is electrically connected to the driving assembly,
   wherein the driving assembly comprises a driving magnet disposed in the lens module and a driving coil disposed in the housing and electrically connected to the reinforcing structure,
   wherein the reinforcing structure includes a first end that is exposed on an inner surface of the housing, and is bent perpendicular to a surface of the housing and faces toward an inside of the housing,
   wherein the reinforcing structure includes a second end that is exposed on an outer surface of the housing, and is bent perpendicular to the surface of the housing and faces toward an outside of the housing,
   wherein the first end is connected to the driving coil, and
   wherein the reinforcing structure passes through the at least one sidewall.

2. The camera module of claim 1, further comprising:
   a detection sensor that is electrically connected to the reinforcing structure, and configured to detect a displacement of the lens module in the direction of the optical axis or the direction intersecting the optical axis.

3. The camera module of claim 2, wherein the reinforcing structure comprises a first reinforcing member and a second reinforcing member,
   wherein the first end comprises a first end of the first reinforcing member and a first end of the second reinforcing member and the first end of the first reinforcing member and the first end of the second reinforcing member are connected to the driving coil, and wherein the second end comprises a second end of the first reinforcing member and a second end of the second reinforcing member and the second end of the first reinforcing member and the second end of the second reinforcing member are respectively connected to connection terminals.

4. The camera module of claim 3, wherein the first reinforcing member and the second reinforcing member each have an inverted U shape or a spiral shape.

5. The camera module of claim 1, further comprising:
a connection terminal formed in the housing, and electrically connected to the driving assembly by the reinforcing structure.

6. The camera module of claim 1, further comprising:
a circuit board on which an image sensor configured to convert an optical signal incident through the lens module into an electrical signal is disposed.

7. The camera module of claim 6, further comprising:
a detection sensor disposed on the circuit board, and configured to detect displacement of the lens module in the direction of the optical axis or the direction intersecting the optical axis.

8. The camera module of claim 1, wherein the reinforcing structure is formed on a flange portion of the housing.

9. The camera module of claim 8, wherein the driving assembly comprises:
a driving magnet disposed in the lens module; and
a driving coil disposed on the reinforcing structure.

10. The camera module of claim 1, wherein the reinforcing structure has a spiral shape.

11. The camera module of claim 1, wherein the reinforcing structure includes a reinforcing member having an inverted U shape.

12. A camera module, comprising:
a housing;
a lens module disposed in the housing;
a driving assembly configured to move the lens module in a direction of an optical axis or a direction intersecting the optical axis; and
a reinforcing structure encapsulated within an inner side and an outer side of the housing, and electrically connected to the driving assembly,
wherein the driving assembly comprises a driving magnet disposed in the lens module and a driving coil disposed in the housing and electrically connected to the reinforcing structure,
wherein the reinforcing structure includes a first end that is exposed on an inner surface of the housing, and is bent perpendicular to a surface of the housing and faces toward an inside of the housing,
wherein the reinforcing structure includes a second end that is exposed on an outer surface of the housing, and is bent toward an outside of the housing,
wherein the first end is connected to the driving coil, and
wherein the reinforcing structure passes through a sidewall of the housing.

* * * * *